(12) United States Patent
Miyachi et al.

(10) Patent No.: US 6,384,889 B1
(45) Date of Patent: May 7, 2002

(54) LIQUID CRYSTAL DISPLAY WITH SUB PIXEL REGIONS DEFINED BY SUB ELECTRODE REGIONS

(75) Inventors: Koichi Miyachi; Makoto Shiomi, both of Tenri; Nobukazu Nagae, Sendai; Mutsumi Nakajima, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/357,814

(22) Filed: Jul. 20, 1999

(30) Foreign Application Priority Data

Jul. 24, 1998 (JP) ............................................ 10-210131
Jul. 24, 1998 (JP) ............................................ 10-210132
Jul. 24, 1998 (JP) ............................................ 10-210133
Jul. 24, 1998 (JP) ............................................ 10-210134

(51) Int. Cl.[7] .............................................. G02F 1/133
(52) U.S. Cl. ...................................... 349/143; 349/129
(58) Field of Search ................................. 349/143, 129, 349/167

(56) References Cited

U.S. PATENT DOCUMENTS 6,067,141 A1 * 5/2001 Yamada et al. ............. 349/129
6,266,122 B1 * 7/2001 Kishimoto et al. ......... 349/156
6,281,960 B1 * 8/2001 Kishimoto et al. ......... 349/156

FOREIGN PATENT DOCUMENTS

| JP | 6-301036 A | 10/1994 |
|---|---|---|
| JP | 7-281176 A | 10/1995 |
| JP | 10-186330 A | 7/1998 |
| KR | 1998-16700 A | 6/1998 |

* cited by examiner

*Primary Examiner*—Kenneth Parker
(74) *Attorney, Agent, or Firm*—Nixon & Vanderhye

(57) ABSTRACT

A liquid crystal display device includes a first substrate; a second substrate; and a liquid crystal layer interposed between the first substrate and the second substrate and having liquid crystal molecules therein. The first substrate includes a first electrode facing the liquid crystal layer. The second substrate includes a second electrode facing the liquid crystal layer. The first electrode, the second electrode, and a region of the liquid crystal layer supplied with a voltage by the first electrode and the second electrode define a pixel region which is a unit for display. The pixel region includes a plurality of sub pixel regions, in each of which the liquid crystal molecules are aligned in an axial symmetrical manner. At least one of the first electrode and the second electrode includes a plurality of openings, which are regularly arranged, in the pixel region. The at least one of the first electrode and the second electrode having the openings include a plurality of polygonal sub electrode regions, each of which has at least a part of the plurality of openings at least one of at corners and along and overlapping sides thereof. The plurality of sub pixel electrodes are defined by the sub electrode regions.

40 Claims, 32 Drawing Sheets

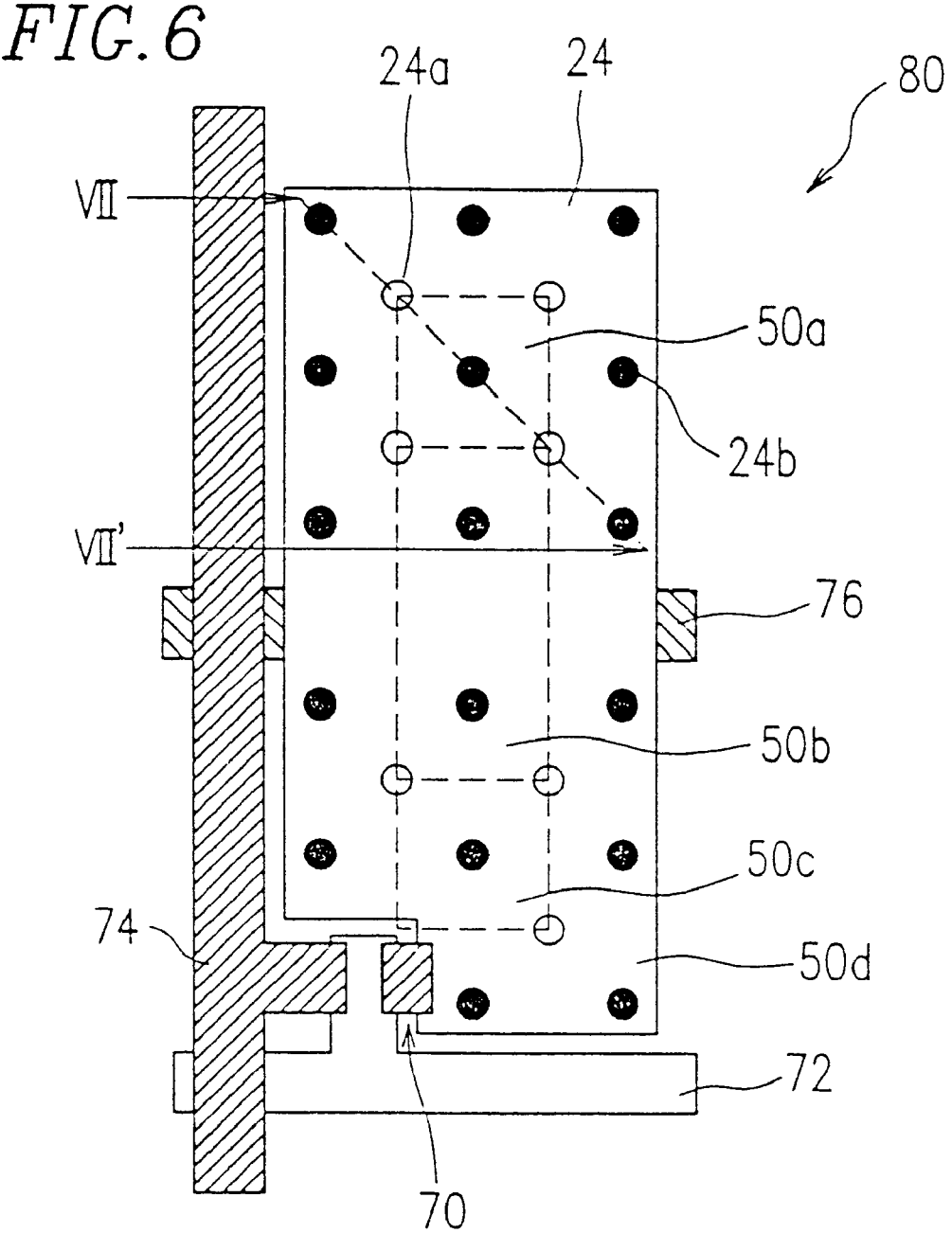

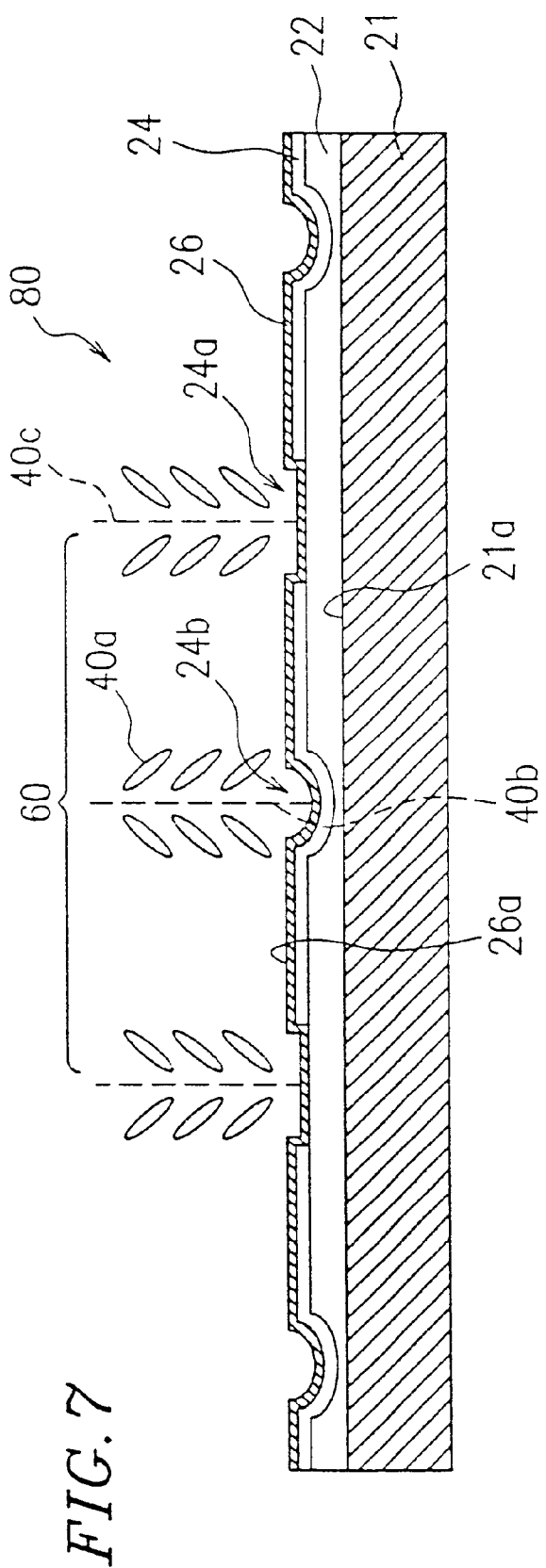

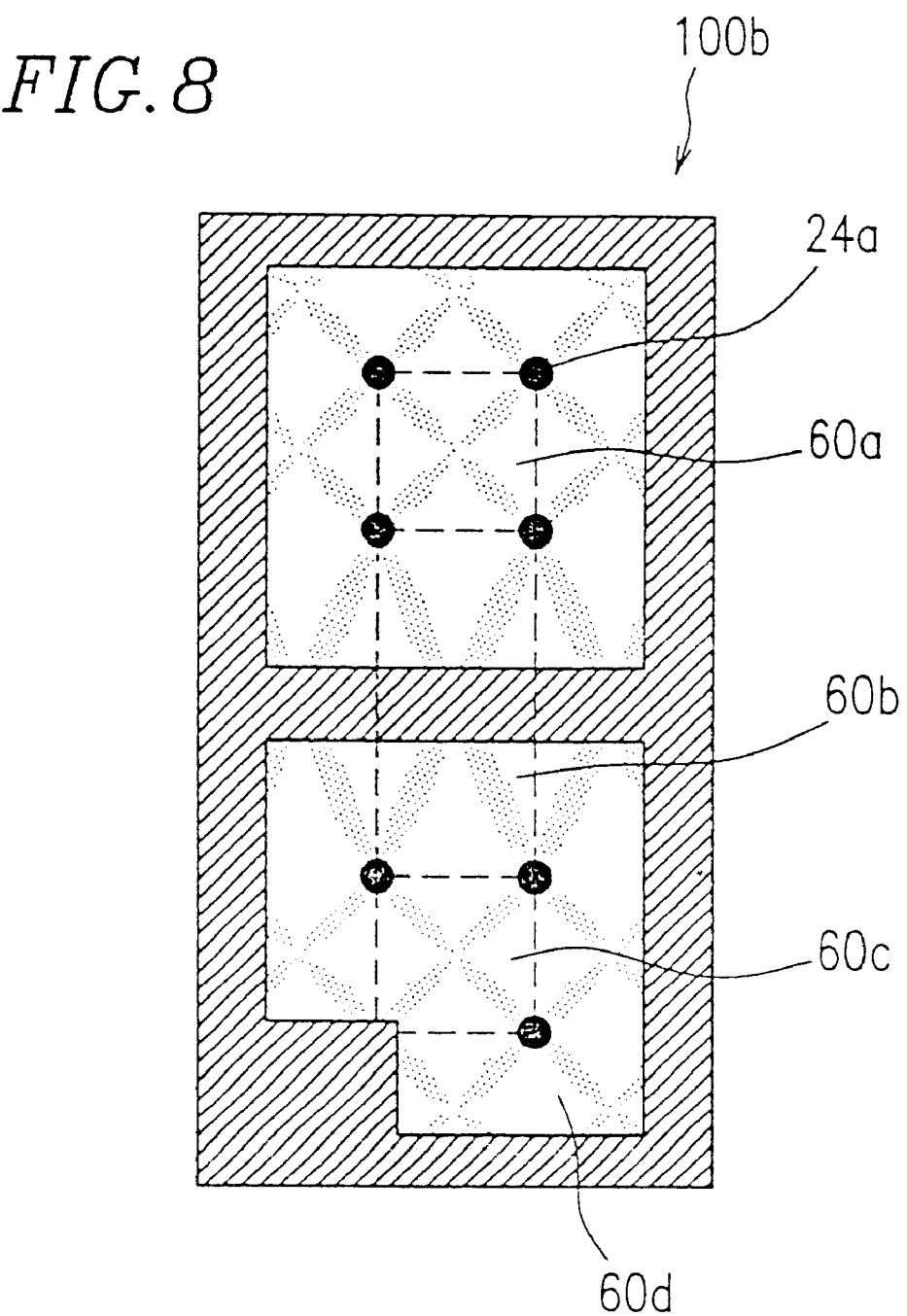

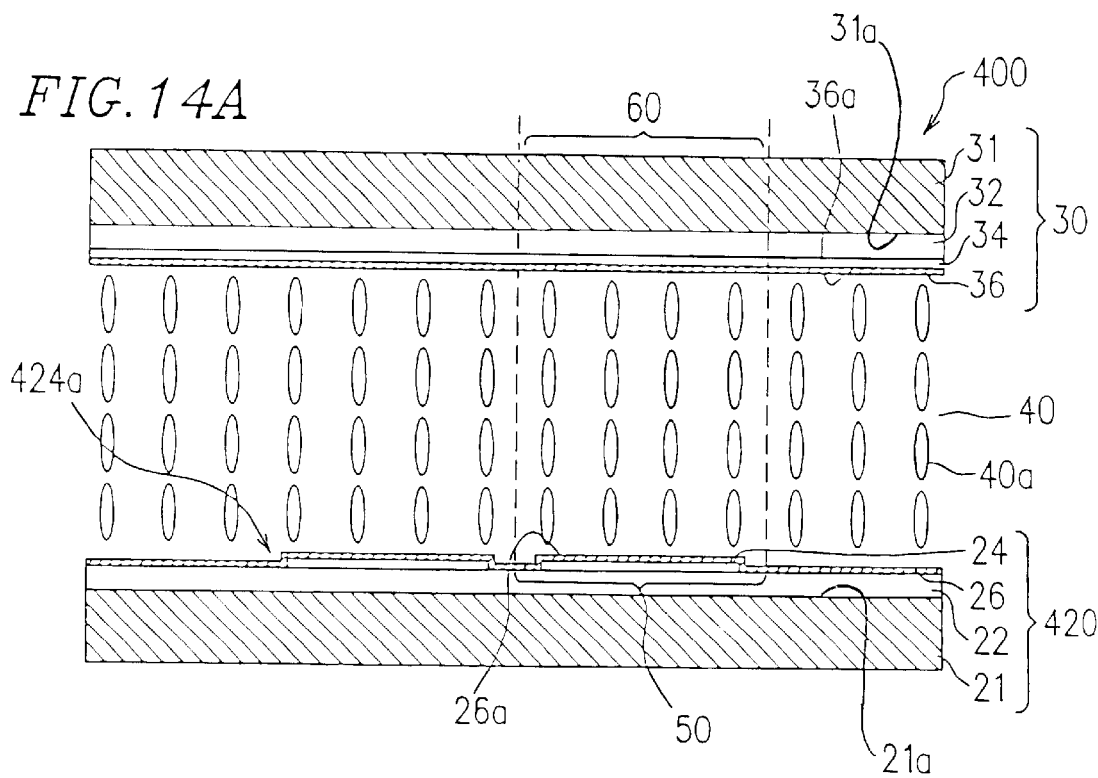
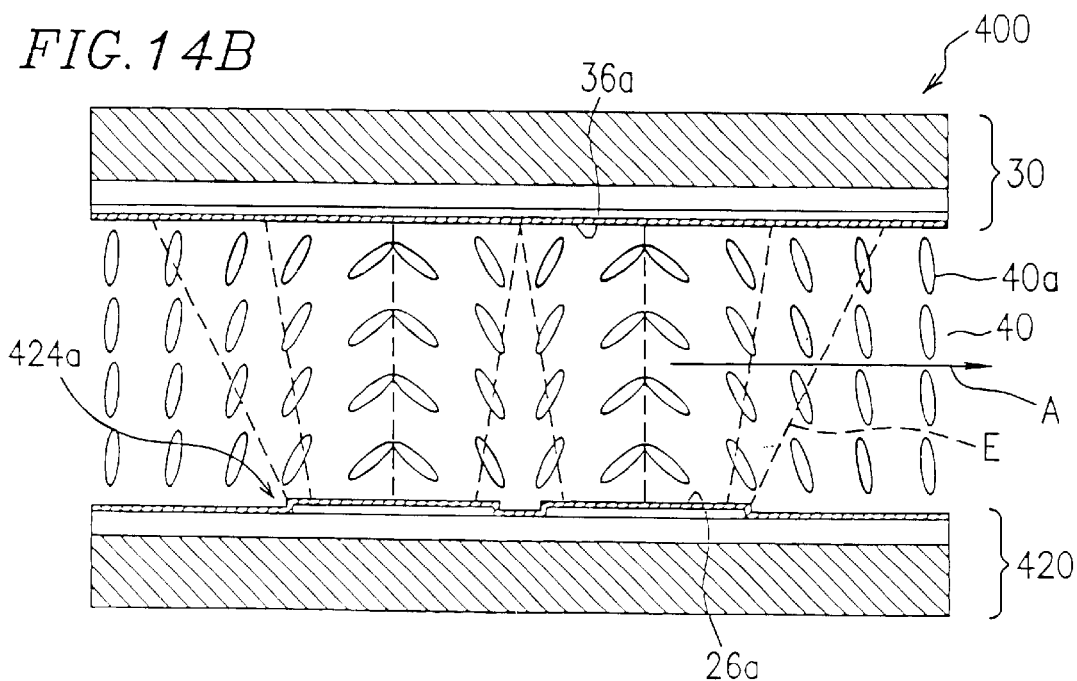

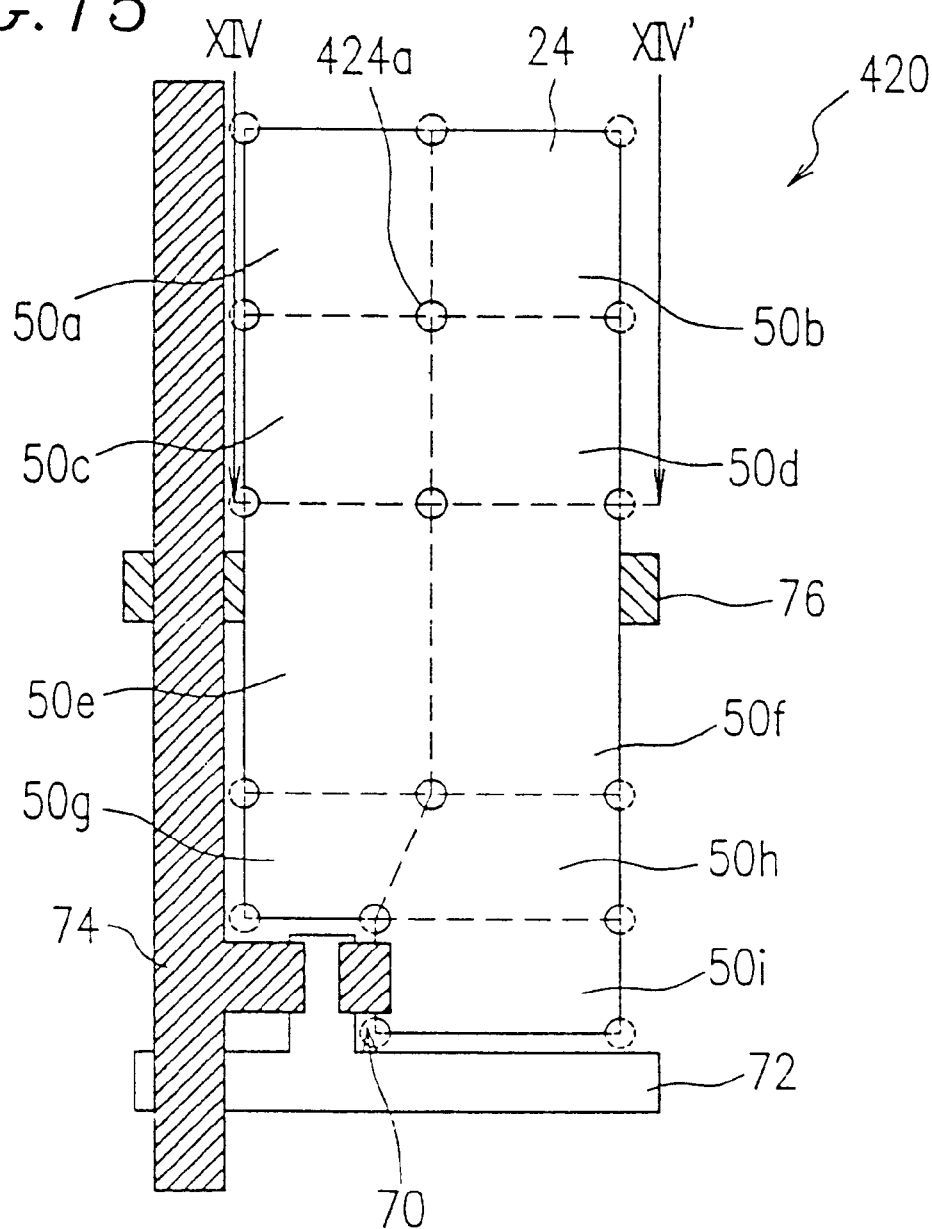

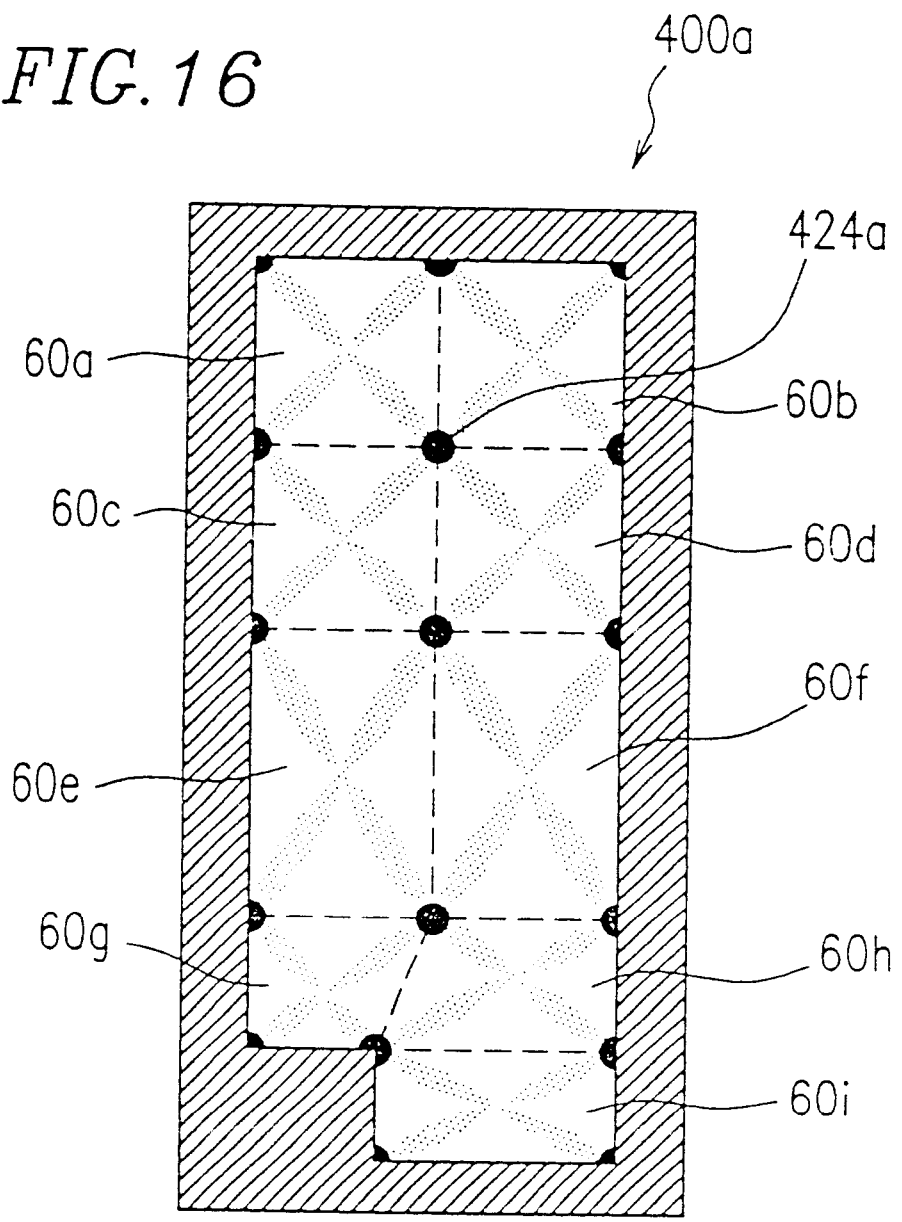

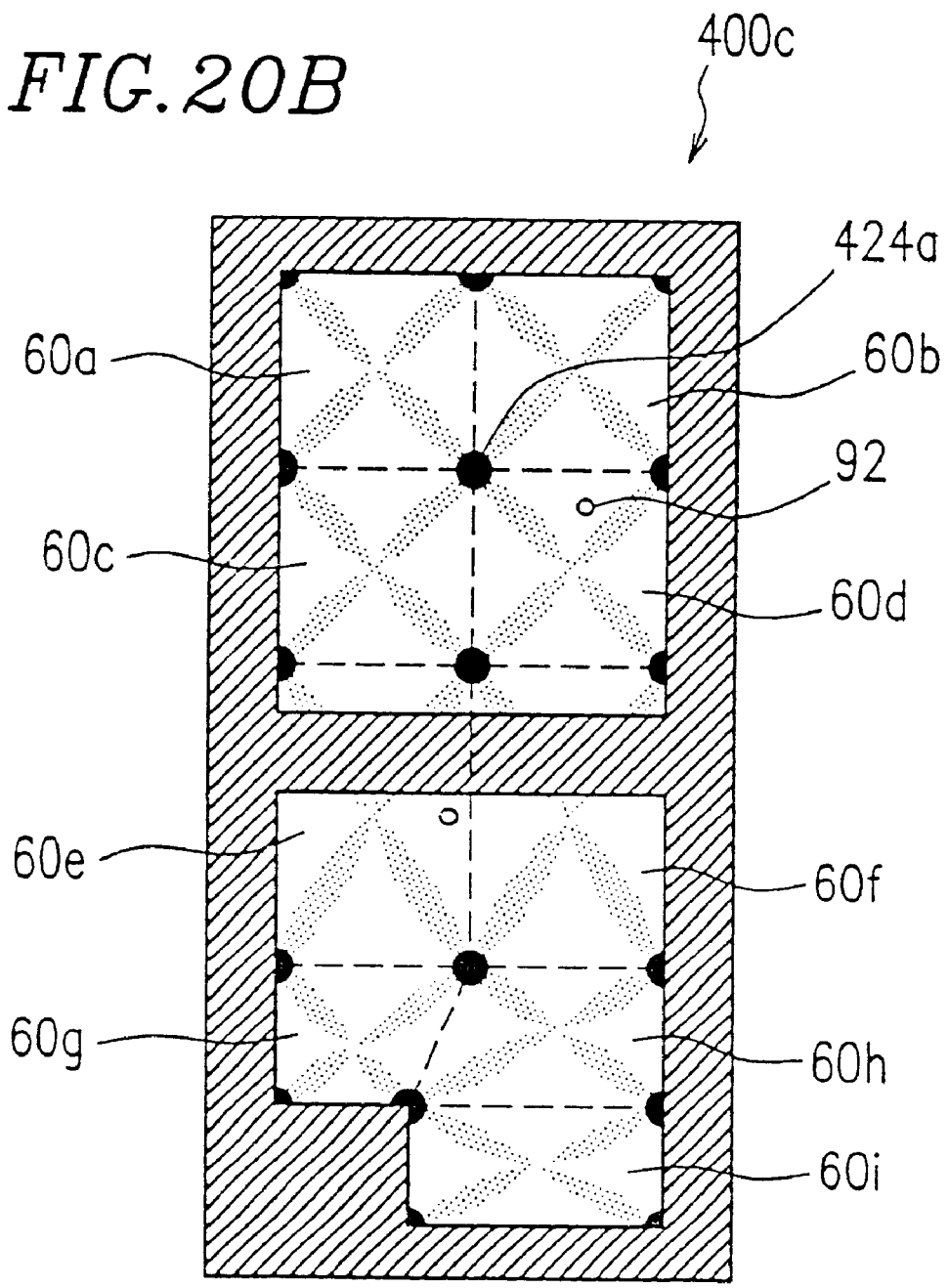

LIQUID CRYSTAL DISPLAY WITH SUB PIXEL REGIONS DEFINED BY SUB ELECTRODE REGIONS

BACKGROUND OF THE INVENTION

1. Field of the Invention

The present invention relates to a liquid crystal display device used for a monitor of, for example, computers, wordprocessors, car navigation systems, and TVs, and a method for producing the same.

2. Description of the Related Art

Today, TN (twisted nematic) liquid crystal display devices (hereinafter, referred to as "LCD devices") are in wide use. In a TN LCD device, upper and lower alignment layers are treated by rubbing in different directions from each other, so that liquid crystal molecules are in a twisted alignment in the state where no voltage is applied. The TN LCD device has problems of a gray scale inversion phenomenon and an excessive dependency of the display quality on the viewing angle.

In order to solve such problems, a liquid crystal material having a negative dielectric anisotropy and a vertical alignment mode which uses a vertical alignment layer has been proposed. The vertical alignment mode provides a black display when no voltage is applied. A satisfactory black display is obtained in a quite large viewing angle range by using, for example, a phase plate having a negative refractive index anisotropy. The use of such a phase plate substantially compensates for birefringence caused by a liquid crystal layer in which the liquid crystal molecules are vertically aligned when no voltage is applied. In this manner, a high contrast display is realized in a wide viewing angle range. However, the vertical alignment mode has the problem of a gray scale inversion phenomenon which is observed in a direction identical with the direction in which the liquid crystal molecules are tilted when a voltage is applied.

Japanese Laid-Open Publication No. 6-301036 discloses an LCD device having an opening at a center of an area of a counter electrode, the area corresponding to a pixel electrode. Such a structure causes an electric field between the pixel electrode and the counter electrode to be inclined with respect to surfaces thereof, whereas the electric field is vertical with respect to the surfaces without such a structure. Accordingly, when a voltage is applied in the vertical alignment mode, the liquid crystal molecules are tilted in an axially symmetrical manner. The dependency of the display quality on the viewing angle of such an LCD device is averaged in all azimuth directions when compared with an LCD device in which the liquid crystal molecules are tilted in one direction. As a result, the LCD device disclosed in the above-mentioned publication provides a quite satisfactory viewing angle characteristic.

Japanese Laid-Open Publication No. 8-341590 discloses an LCD device having a projection surrounding a pixel region or divided pixel region and also an alignment fixing layer. Such a structure defines the position and the size of the liquid crystal region in which the liquid crystal molecules are aligned in an axially symmetrical manner, and stabilizes the axially symmetric alignment of the liquid crystal molecules.

However, the structure disclosed in Japanese Laid-Open Publication No. 6-301036 makes it difficult to generate an electric field inclined with respect to the electrode surface uniformly in the entirety of pixel regions. As a result, the liquid crystal molecules respond to the application of the voltage in a delayed manner in a part of the pixel regions, which results in an image sticking phenomenon.

The structure disclosed in Japanese Laid-Open Publication No. 8-341590 requires a projections to be formed of a resist or the like on a base plate. This increases the number of production steps and thus raises costs.

SUMMARY OF THE INVENTION

According to one aspect of the invention, a liquid crystal display device includes a first substrate; a second substrate; and a liquid crystal layer interposed between the first substrate and the second substrate and having liquid crystal molecules therein. The first substrate includes a first electrode facing the liquid crystal layer. The second substrate includes a second electrode facing the liquid crystal layer. The first electrode, the second electrode, and a region of the liquid crystal layer supplied with a voltage by the first electrode and the second electrode define a pixel region which is a unit for display. The pixel region includes a plurality of sub pixel regions, in each of which the liquid crystal molecules are aligned in an axial symmetrical manner. At least one of the first electrode and the second electrode includes a plurality of openings, which are regularly arranged, in the pixel region. The at least one of the first electrode and the second electrode having the openings include a plurality of polygonal sub electrode regions, each of which has at least a part of the plurality of openings at least one of at corners and along and overlapping sides thereof. The plurality of sub pixel electrodes are defined by the sub electrode regions.

In one embodiment of the invention, the first electrode includes a plurality of pixel electrodes arranged in a matrix, and the plurality of pixel electrodes are each connected to a scanning line and a signal line through a switching device. The second electrode is a counter electrode facing the plurality of pixel electrodes. The plurality of pixel electrodes each have at least one of the plurality of sub electrode regions.

In one embodiment of the invention, at least two of the plurality of sub electrode regions are congruent polygons to each other and share a common side.

In one embodiment of the invention, the polygons each have rotationary symmetry, and the liquid crystal molecules are aligned in an axially symmetrical manner with respect to an axis for the rotationary symmetry of the polygons.

In one embodiment of the invention, at least two of the plurality of sub electrode regions are polygons sharing a common side, and the openings are at least 2 μm away from an edge of the pixel electrode.

In one embodiment of the invention, the polygons are congruent to each other.

In one embodiment of the invention, the polygons each have rotationary symmetry, and the liquid crystal molecules are aligned in an axially symmetrical manner with respect to an axis for the rotationary symmetry of the polygons.

In one embodiment of the invention, the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

In one embodiment of the invention, at least one of the first substrate and the second substrate includes a column-like projection, for controlling the thickness of the liquid crystal layer, outside the pixel region.

In one embodiment of the invention, the liquid crystal layer includes a chiral dopant, and the liquid crystal molecules have a spiral pitch which is about four times the thickness of the liquid crystal layer.

In one embodiment of the invention, the liquid crystal display device further includes a pair of polarizers interposing the first substrate and the second substrate, and at least one monoaxial phase plate having a negative refractive index anisotropy.

In one embodiment of the invention, the liquid crystal display device further includes a pair of polarizers interposing the first substrate and the second substrate, and at least one monoaxial phase plate having a positive refractive index anisotropy.

In one embodiment of the invention, the liquid crystal display device further includes a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

In one embodiment of the invention, at least two of the plurality of sub electrode regions are polygons sharing a common side, and at least one of sides of at least one of the sub electrode regions matches at least one of edges of the pixel electrode.

In one embodiment of the invention, the polygons are congruent to each other.

In one embodiment of the invention, the polygons each have rotationary symmetry, and the liquid crystal molecules are aligned in an axially symmetrical manner with respect to an axis for the rotationary symmetry of the polygons.

In one embodiment of the invention, the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

In one embodiment of the invention, at least one of the first substrate and the second substrate includes a column-like projection, for controlling the thickness of the liquid crystal layer, outside the pixel region.

In one embodiment of the invention, the liquid crystal layer includes a chiral dopant, and the liquid crystal molecules have a spiral pitch which is about four times the thickness of the liquid crystal layer.

In one embodiment of the invention, the liquid crystal display device further includes a pair of polarizers interposing the first substrate and the second substrate, and at least one monoaxial phase plate having a negative refractive index anisotropy at least one of between the first substrate and the polarizer closer to the first substrate than to the second substrate and between the second substrate and the polarizer closer to the second substrate than to the first substrate.

In one embodiment of the invention, the liquid crystal display device further includes a pair of polarizers interposing the first substrate and the second substrate, and at least one monoaxial phase plate having a positive refractive index anisotropy at least one of between the first substrate and the polarizer closer to the first substrate than to the second substrate and between the second substrate and the polarizer closer to the second substrate than to the first substrate.

In one embodiment of the invention, the liquid crystal display device further includes a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

In one embodiment of the invention, at least one of the first substrate and the second substrate has an alignment fixing layer, for controlling the axial symmetrical alignment of the liquid crystal molecules, between the liquid crystal layer and at least one of the first electrode and the second electrode.

In one embodiment of the invention, the first electrode includes a plurality of pixel electrodes arranged in a matrix, and the plurality of pixel electrodes are each connected to a scanning line and a signal line through a switching device. The second electrode is a counter electrode facing the plurality of pixel electrodes. The plurality of pixel electrodes each have at least one of the plurality of sub electrode regions.

In one embodiment of the invention, at least two of the plurality of sub electrode regions are congruent polygons to each other and share a common side.

In one embodiment of the invention, the polygons each have rotationary symmetry, and the liquid crystal molecules are aligned in an axially symmetrical manner with respect to an axis for the rotationary symmetry of the polygons.

In one embodiment of the invention, at least one of the first substrate and the second substrate includes a column-like projection, for controlling the thickness of the liquid crystal layer, outside the pixel region.

In one embodiment of the invention, the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

In one embodiment of the invention, the liquid crystal display device further includes a pair of polarizers interposing the first substrate and the second substrate, and at least one monoaxial phase plate having a negative refractive index anisotropy.

In one embodiment of the invention, the liquid crystal display device further includes a pair of polarizers interposing the first substrate and the second substrate, and at least one monoaxial phase plate having a positive refractive index anisotropy.

In one embodiment of the invention, the liquid crystal display device further includes a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

In one embodiment of the invention, the liquid crystal layer includes a chiral dopant, and the liquid crystal molecules have a spiral pitch which is about four times the thickness of the liquid crystal layer.

In one embodiment of the invention, at least one of the first electrode and the second electrode has a plurality of recessed portions which are regularly arranged.

In one embodiment of the invention, at least one of the first substrate and the second substrate includes a column-like projection, for controlling the thickness of the liquid crystal layer.

In one embodiment of the invention, the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

In one embodiment of the invention, the liquid crystal display device further includes a pair of polarizers interposing the first substrate and the second substrate, and at least one monoaxial phase plate having a negative refractive index anisotropy at least one of between the first substrate and the polarizer closer to the first substrate than to the second substrate and between the second substrate and the polarizer closer to the second substrate than to the first substrate.

In one embodiment of the invention, the liquid crystal display device further includes a pair of polarizers interposing the first substrate and the second substrate, and at least one monoaxial phase plate having a positive refractive index anisotropy at least one of between the first substrate and the polarizer closer to the first substrate than to the second substrate and between the second substrate and the polarizer closer to the second substrate than to the first substrate.

In one embodiment of the invention, the liquid crystal display device further includes a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

In one embodiment of the invention, the liquid crystal layer includes a chiral dopant, and the liquid crystal molecules have a spiral pitch which is about four times the thickness of the liquid crystal layer.

According to another aspect of the invention, a method for producing a liquid crystal display device including a first substrate, a second substrate, and a liquid crystal layer interposed between the first substrate and the second substrate and formed of a liquid crystal material having liquid crystal molecules, wherein the first substrate includes a first electrode facing the liquid crystal layer; the second substrate includes a second electrode facing the liquid crystal layer; the first electrode, the second electrode, and a region of the liquid crystal layer supplied with a voltage by the first electrode and the second electrode define a pixel region which is a unit for display; and the pixel region includes a plurality of sub pixel regions, in each of which the liquid crystal molecules are aligned in an axial symmetrical manner includes the steps of forming a plurality of openings regularly arranged in at least one of the first electrode and the second electrode in the pixel region, so that the at least one of the first electrode and the second electrode having the openings include a plurality of polygonal sub electrode regions, each of which has a part of the openings at least at one of corners and along and overlapping sides thereof; injecting a mixture of a photocurable resin and the liquid crystal material into a gap between the first substrate and the second substrate; and irradiating the mixture with light while supplying the mixture with a voltage, thereby curing the photocurable resin and thus forming an alignment fixing layer.

In an LCD device according to the present invention, an electrode for applying a voltage to the liquid crystal layer has an opening (an area which does not act as an electrode) in a pixel region, which is a unit for display. Since no electric field is generated at the opening, an electric field around the opening is inclined with respect to a direction normal to the surface of the electrode. For example, liquid crystal molecules having a negative dielectric anisotropy are aligned so that longitudinal axes thereof are vertical to the electric field. Accordingly, the liquid crystal molecules are aligned in a radial (i.e., axially symmetrical) manner around the opening due to the oblique electric field. As a result, the dependency of the display quality of the LCD device on the viewing angle, which is caused by the refractive index anisotropy of the liquid crystal molecules, is averaged in all azimuth directions.

In an embodiment where polygonal sub electrode regions having openings at least either at corners or along and overlapping sides thereof, the liquid crystal molecules are aligned in an axially symmetrical manner in a plurality of sub pixel regions in each of the pixel regions. In an embodiment where the polygonal sub electrode regions are congruent to each other, the sub pixel regions defined by the polygonal sub electrode regions are arranged highly symmetrically. Accordingly, the uniformity of the viewing angle characteristic is improved. In an embodiment where the polygons each have rotationary symmetry (n-fold symmetry), the viewing characteristic is further improved.

In an embodiment where the electrode has a recessed portion in a pixel region, the liquid crystal molecules above the recessed portion are aligned vertically with respect to an area of the vertical alignment layer, the area being concaved in conformity of the recessed portion. In other words, the liquid crystal molecules above the recessed portion are tilted in an axially symmetrical manner with respect to the center axis of the recessed portion. In an embodiment where the recessed portion is at an intermediate position between two adjacent openings, the axis for the axial symmetrical alignment matches the center axis of the recessed portion. Thus, the position of the center axis for the axial symmetrical alignment is secured and stabilized.

In an embodiment where the openings are at least 2 $\mu$m away from the edge of the pixel electrode, the alignment of the liquid crystal molecules is prevented from becoming unstable due to the lateral electric field generated by scanning lines and signal lines (bus lines) provided for connecting the active devices in the vicinity of an edge of the pixel electrode.

In an embodiment where at least one side of at least one sub electrode region matches at least one edge of the pixel electrode, generation of disclination at the edge of the pixel electrode is suppressed.

In an embodiment where an alignment fixing layer is provided between the liquid crystal layer and at least either the first substrate or the second substrate, the alignment of the liquid crystal molecules is stabilized, which provides a bright display.

Thus, the invention described herein makes possible the advantages of providing an LCD device having a satisfactory viewing angle characteristic and generating no image sticking phenomenon, and a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 6 is a top view of an active matrix substrate of an LCD device in a second example according to the present invention;

FIG. 7 is a cross-sectional view of the active matrix substrate taken along line VII–VII' in FIG. 6;

FIG. 8 is a view of the LCD device in the second example observed with a polarizing microscope in a crossed nicols state, the LCD device being supplied with a voltage for gray scale display;

FIG. 14A is a cross-sectional view of an LCD device in a fourth example according to the present invention, illustrating the state when no voltage is applied;

FIG. 14B is a cross-sectional view of the LCD device shown in FIG. 14A, illustrating the state when a voltage is applied;

FIG. 15 is a top view of an active matrix substrate of the LCD device shown in FIG. 14A;

FIG. 16 is a view of the LCD device shown in FIG. 14A observed with a polarizing microscope in a crossed nicols state, the LCD device being supplied with a voltage for gray scale display;

FIGS. 20A and 20B are each a view of an LCD device observed with a polarizing microscope in a crossed nicols state, illustrating the axially symmetrical alignment of the liquid crystal molecules disturbed by plastic beads;

DESCRIPTION OF THE PREFERRED EMBODIMENTS

Hereinafter, the present invention will be described by way of illustrative examples with reference to the accompanying drawings. In the following examples, transmission LCD devices will be described, but the present invention is not limited to this type of LCD devices.

EXAMPLE 1

Figure 1A:
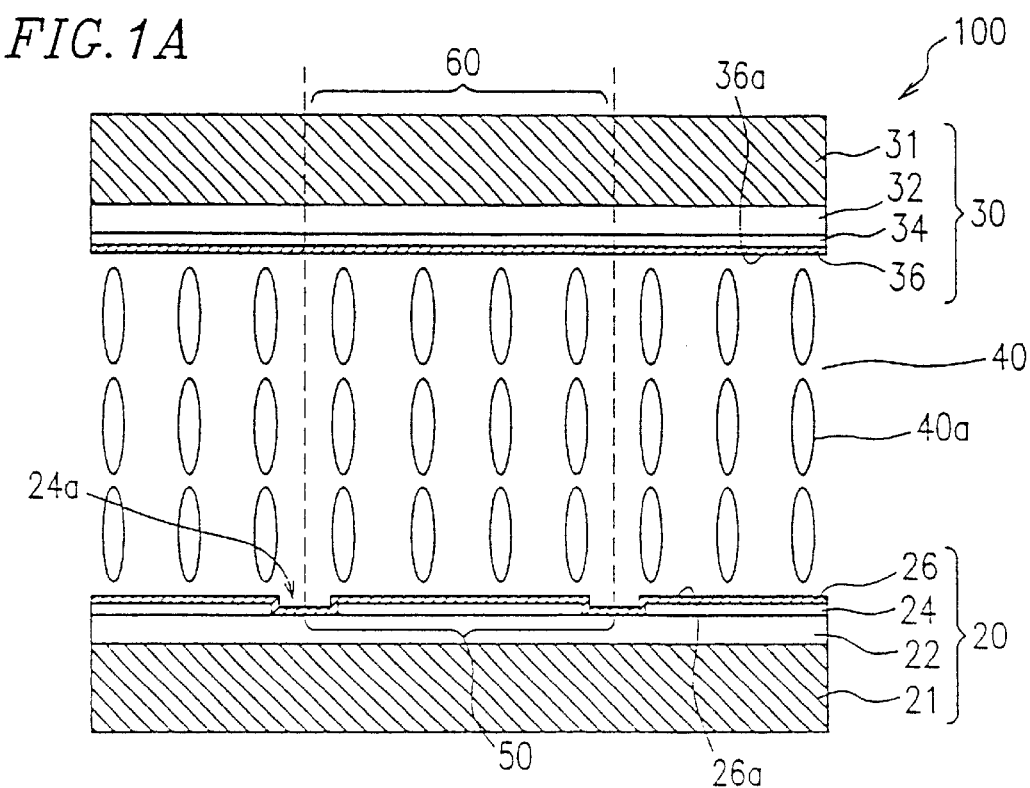
FIG. 1A is a cross-sectional view of an LCD device in a first example according to the present invention, illustrating the state when no voltage is applied.
Figure 1B:
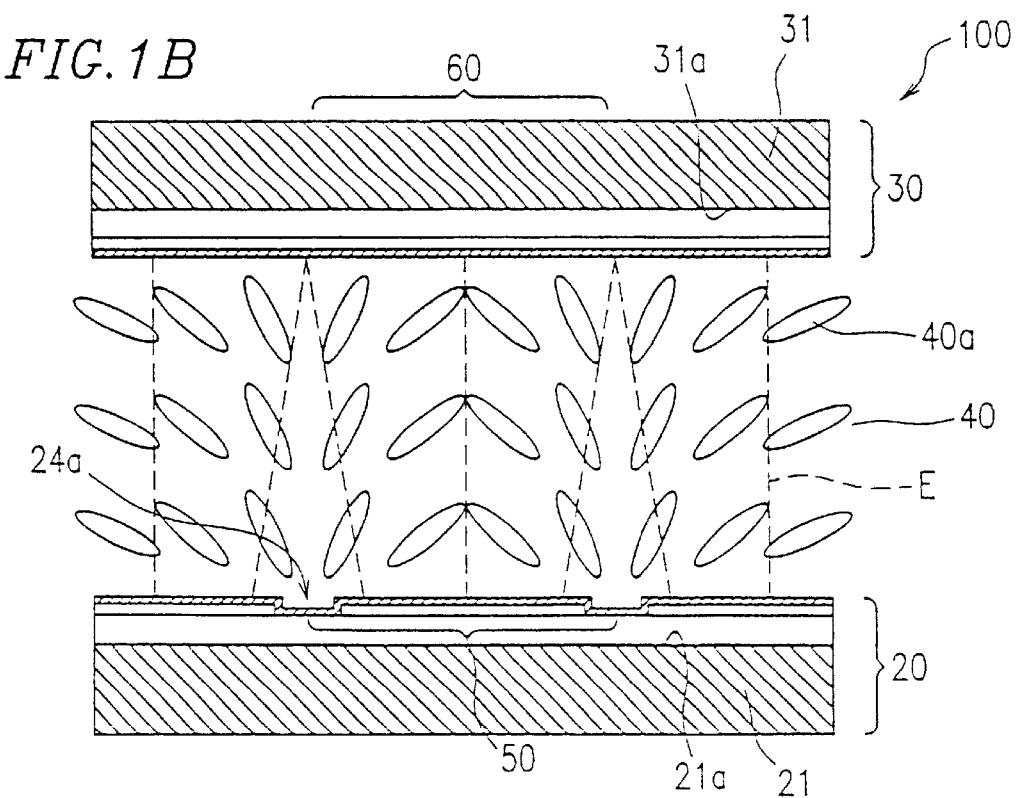
FIG. 1B is a cross-sectional view of the LCD device shown in FIG. 1A, illustrating the state when a voltage is applied.

A LCD device 100 in a first example according to the present invention will be described. FIGS. 1A and 1B are schematic cross-sectional views of the LCD device 100. FIG. 1A shows the state when no voltage is applied, and FIG. 1B shows the state when a voltage is applied. FIGS. 1A and 1B show one pixel region of the LCD device 100. Unless otherwise specified, the following description will be given regarding the one pixel region.

The LCD device 100 includes an active matrix substrate 20, a counter substrate (color filter substrate) 30, and a liquid crystal layer 40 interposed between the active matrix substrate 20 and the counter substrate 30. The active matrix substrate 20 includes a transparent base plate 21, an insulating layer 22, a pixel electrode 24, and an alignment layer 26. The insulating layer 22, the pixel electrode 24, and the alignment layer 26 are sequentially provided in this order on a surface 21a of the base plate 21, the surface 21a facing the liquid crystal layer 40. The active matrix substrate 20 includes an active device (typically, a TFT) and lines for applying a voltage to the pixel electrode 24, which are not shown in FIG. 1A or 1B for simplicity. The counter substrate 30 includes a transparent base plate 31, a color filter layer 32, a counter electrode 34, and an alignment layer 36. The color filter layer 32, the counter electrode 34, and the alignment layer 36 are provided in this order on a surface 31a of the base plate 31, the surface 31 a facing the liquid crystal layer 40. In this example, the alignment layers 26 and 36 are vertical alignment layers, and the liquid crystal layer 40 is formed of a liquid crystal material having a negative dielectric material.

The pixel electrode 24 has a plurality of openings 24a, which are circular in this example. Needless to say, the plurality of openings 24a do not act as an electrode. As described later in detail, the plurality of openings 24a define a polygonal sub electrode region 50 having the openings 24a at corners or along and overlapping sides thereof. The liquid crystal molecules 40a in a sub pixel region 60 defined by the sub electrode region 50 are aligned in an axially symmetrical manner by the action of the openings 24a.

When no voltage is applied to the liquid crystal layer 40 as shown in FIG. 1A, the liquid crystal molecules 40a are aligned vertically to surfaces 26a and 36a of the vertical alignment layers 26 and 36 by the alignment force thereof. In this specification, the expression "surface of the first substrate" and "surface of the second substrate" refer to the direction parallel to the surface 26a. When a voltage is applied to the liquid crystal layer 40 as shown in FIG. 1B, the liquid crystal molecules 40a, which have a negative dielectric anisotropy, are aligned so that longitudinal axes thereof are vertical with respect to an electric line of force E. In the vicinity of the openings 24a, the electric line of force E is inclined with respect to the surfaces 21a and 31a of the base plates 21 and 31 (substantially parallel to the surfaces 26a and 36a of the vertical alignment layers 26 and 36 ). Accordingly, the liquid crystal molecules 40a in the vicinity of the openings 24a are aligned radially around each opening 24a. The liquid crystal molecules 40a farther from the opening 24a are tilted at a greater angle with respect to the line normal to the surfaces 21a and 31a than the liquid crystal molecules 40a closer to the opening 24a. Thus, the liquid crystal molecules 40a in the sub pixel region 60 are aligned in an axially symmetrical manner.

Figure 2:
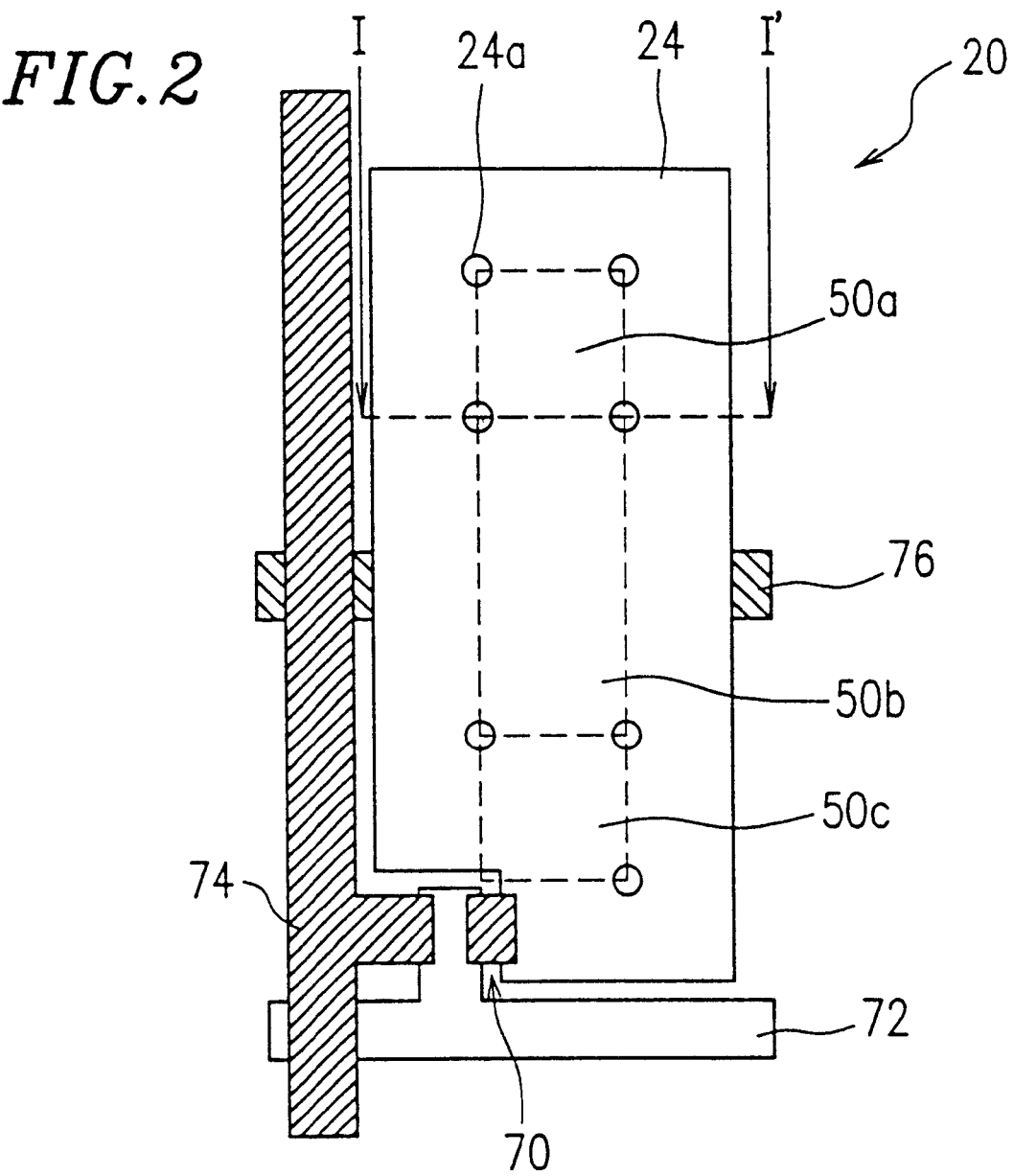
FIG. 2 is a top view of an active matrix substrate of the LCD device shown in FIG. 1A.

FIG. 2 is a top view of the active matrix substrate 20 of the pixel region of the LCD device 100 shown in FIGS. 1A and 1B. FIGS. 1A and 1B illustrate the cross-section taken along line I–I' in FIG. 2.

As shown in FIG. 2, the active matrix substrate 20 includes a TFT 70 for controlling the voltage to be applied to the pixel electrode 24, a gate line (scanning line) 72 for supplying a scanning signal to a gate electrode of the TFT 70, a source line (signal line) 74 for supplying a data signal to a source electrode of the TFT 70, and a storage capacitance common line 76 having the same potential as that of the pixel electrode 24. In this example, a so-called Cs-on-Common structure in which a storage capacitance is formed using the storage capacitance common line 76 is used. Alternatively, a so-called Cs-on-Gate structure in which a storage capacitance is formed using the gate line 72 is usable, or formation of the storage capacitance can be omitted.

As described above, the pixel electrode 24 has the plurality of openings 24a. The openings 24a will be described in detail with reference to FIG. 2. As shown in FIG. 2, the openings 24a define sub electrode regions 50a, 50b and 50c (each corresponding to the sub electrode region 50 in FIGS. 1A and 1B). The sub electrode regions 50a, 50b and 50c have the openings 24a at corners thereof. In more detail, the sub electrode regions 50a, 50b and 50c are polygons defined by lines linking centers of each two openings 24a which are closest to each other. In this example, the sub electrode regions 50a, 50b and 50c are quadrangular. A cut-off part of the pixel electrode 24a (lower left part in FIG. 2) in the vicinity of the sub electrode region 50c forms an opening. The sub electrode regions 50a and 50c are squares, having a four-fold axis of symmetry at centers thereof, which are congruent to each other. The sub electrode region 50b is a rectangle having a two-fold axis of symmetry at a center thereof. The sub electrode region 50b shares one side with each of the sub electrode regions 50a and 50c.

The LCD device 100 in the first example can be produced in, for example, the following manner (refer to FIGS. 1A and 1B regarding the reference numerals). The active matrix substrate 20 can be produced by a known method used for producing an active matrix substrate, except that the pixel electrode 24 is formed by using a pattern which causes the openings 24a as shown in FIG. 2 to be formed. Thus, the active matrix substrate 20 can be produced without increasing the number of production steps. The counter substrate 30 can also be produced by a known method. The pixel electrode 24 and the counter electrode 34 are formed of, for example, ITO (indium tin oxide) to have a thickness of about 50 nm.

The laminate including the base plate 21, the insulating layer 22, and the pixel electrode 24 is coated with the vertical alignment layer 26 by printing. The laminate including the base plate 31, the color filter layer 32, and the counter electrode 34 is coated with the vertical alignment layer 36 by printing. The vertical alignment layers 26 and 36 are formed of a polyimide-based material (for example, JALS-204, Japan Synthetic Rubber Co., Ltd.). Alternatively, the vertical alignment layers 26 and 36 can be formed of various other materials which cause liquid crystal molecules to be aligned vertically with respect to the surfaces 26a and 36a of the vertical alignment layers 26 and 36. Such materials include, for example, octadecyl ethoxysilane and lecithin. Thus, the active matrix substrate 20 and the counter substrate 30 are formed.

Then, plastic beads having a diameter of about 4.5 μm are distributed on the vertical alignment layer 26. On the counter substrate 30, a seal section formed of an epoxy resin including fiberglass is formed along a periphery of a display area by screen printing. The active matrix substrate 20 and the counter substrate 30 are bonded together and cured by heating. Next, a liquid crystal material having a negative dielectric anisotropy ($\Delta\epsilon=-4.0$, $\Delta n=0.08$) is injected into a gap between the active matrix substrate 20 and the counter substrate 30 using vacuum injection. In this manner, the LCD device 100 is completed.

In this example, the pixel electrode 24 has openings 24a. Alternatively, the counter electrode 34 can have openings. The effect of the present invention is obtained by forming a plurality of openings in an electrode provided in a pixel region, which is a unit for display. Forming the openings 24a in the pixel electrode 24 is advantageous in that the openings 24a are formed in the step of forming the pixel electrode 24 by patterning a conductive film and thus the number of production steps is not increased.

Figure 3:
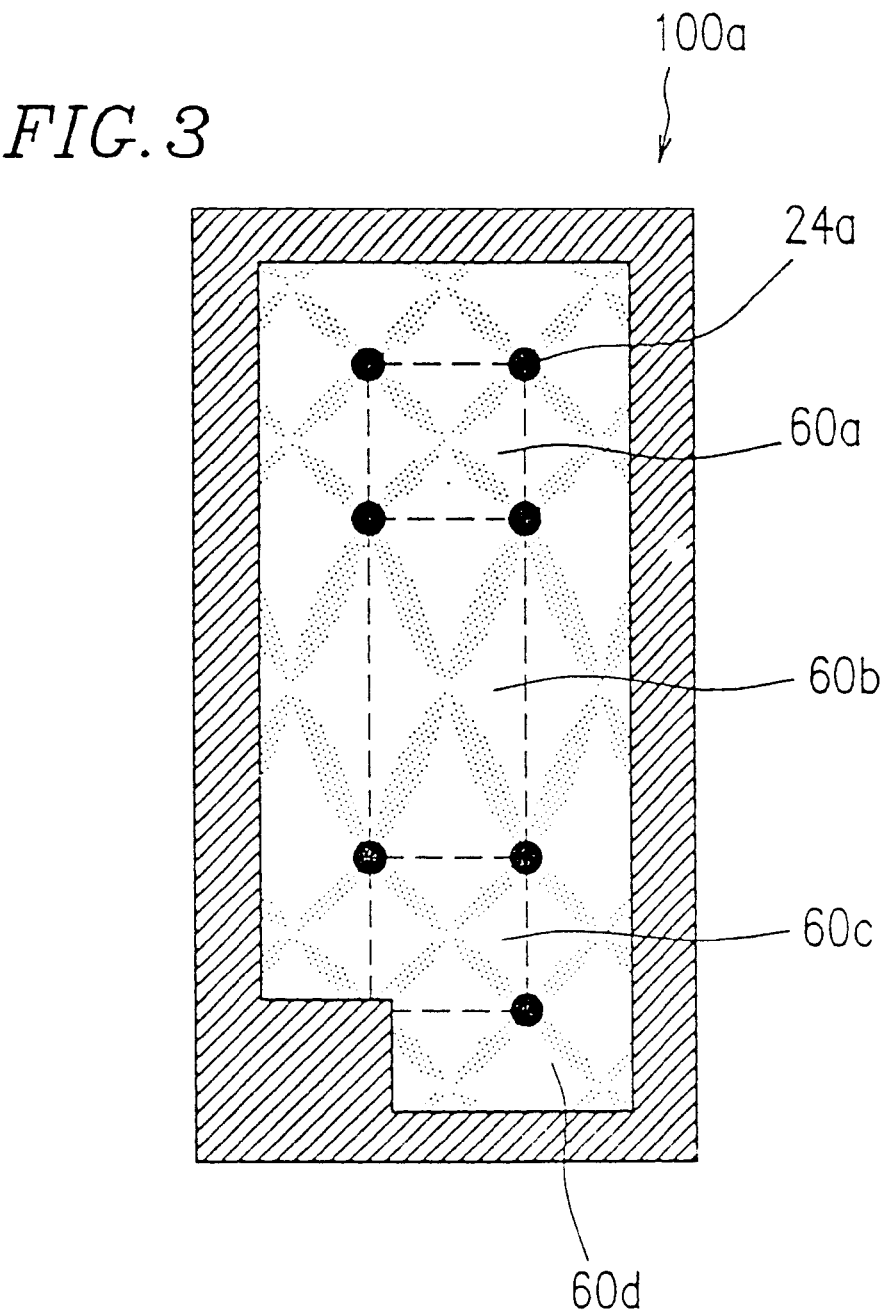
FIG. 3 is a view of the LCD device shown in FIG. 1A observed with a polarizing microscope in a crossed nicols state, the LCD device being supplied with a voltage for gray scale display.

FIG. 3 shows a top view of one pixel region (represented as 100a in FIG. 3) of the LCD device 100 shown in FIG. 2 which is observed with a polarizing microscope in a crossed nicols state. In FIG. 3, the LCD device 100 is supplied with a voltage for gray scale display. The pixel region 100a includes sub pixel regions 60a, 60b and 60c which are respectively defined by the sub electrode regions 50a, 50b and 50c in FIG. 2. A part of the pixel region 100a corresponding to the TFT 70, the gate line 72, the source line 74 (FIG. 2) and the like which block light (or a part corresponding to a black matrix) is observed to be black (hatched in FIG. 3). The openings 24a are also observed to be black. The storage capacitance common line 76 is formed of a transparent material. In this example, the pixel region pitch in the longer side is about 300 μm, the pixel region pitch in the shorter side is about 100 μm, and the diameter of each opening 24a is about 10 μm.

As can be appreciated from FIG. 3, the sub pixel regions 60a, 60b and 60c are observed to have a crossed extinction pattern, which demonstrates that the liquid crystal molecules are aligned in an axially symmetrical manner. In the sub pixel regions 60a and 60c which are square, an extinction pattern having a four-fold axis of symmetry is observed. In the sub pixel region 60b which is rectangular, an extinction pattern having a two-fold axis of symmetry is observed. In a peripheral region 60d surrounding the sub pixel regions 60a, 60b and 60c, an extinction pattern which is similar to that in each of the sub pixel regions is observed. Such a phenomenon demonstrates that the liquid crystal molecules are aligned in an axially symmetrical manner in the peripheral region 60d. In other words, in the peripheral region 60d, the liquid crystal molecules are aligned substantially radially around each opening 24a. This occurs since the alignment of the liquid crystal molecules 40a tilted by the oblique electric field generated by the opening 24a is conveyed to the liquid crystal molecules in the peripheral region 60d.

In such an LCD device 100, each of a plurality of pixel regions, in its entirety, has sub regions in which the liquid crystal molecules 40a (FIGS. 1A and 1B) are aligned in an axially symmetrical manner. Accordingly, the viewing angle characteristic of the LCD device 100 does not vary in accordance with the azimuth angle of the viewing direction, and thus the LCD device 100 has a high viewing angle characteristic. When no voltage is applied to the liquid crystal layer 40 (FIGS. 1A and 1B), substantially all the liquid crystal molecules are vertical with respect to the surfaces 21a and 31a of the glass plates 21 and 31, and thus a satisfactory black display is provided. When a voltage is applied, satisfactory white display is provided with a response time of about 20 msec. When a voltage for gray scale display is applied, the axially symmetrical alignment of the liquid crystal molecules is not disturbed. The response time is sufficiently short, and no image sticking phenomenon is exhibited. The axially symmetrical alignment is quite stable, and no defective alignment is generated in a repeated operation test.

In this example, the sub electrode regions 50a, 50b and 50c are quadrangular. The sub electrode regions do not need to be quadrangular, but can be a polygon having openings at corners or along and overlapping sides thereof. The sub electrode regions can be a triangle, but preferably is a polygon having four or more corners in order to provide a uniform dependency on the azimuth angle of the viewing characteristic. A square is more advantageous than a rectangle since a square has higher rotationary symmetry and thus provides a more uniform viewing characteristic than a rectangle.

Figure 4A:
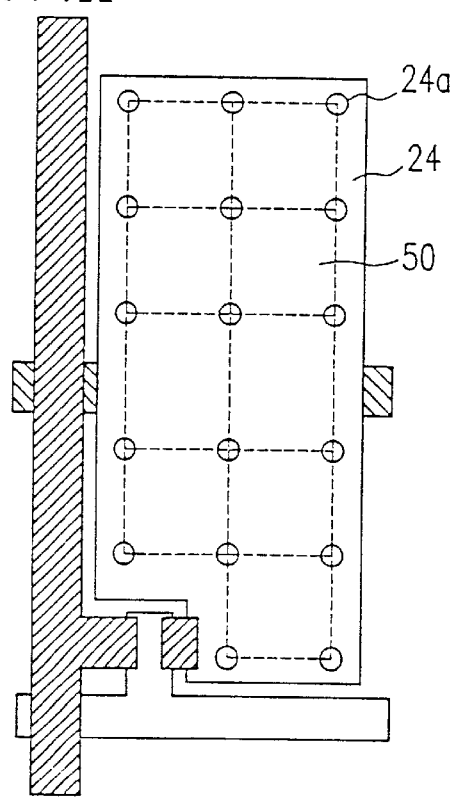
FIGS. 4A, 4B and 4C are top views of active matrix substrates, illustrating various alternative arrangements of openings of the pixel electrode in the first example.
Figure 4B:
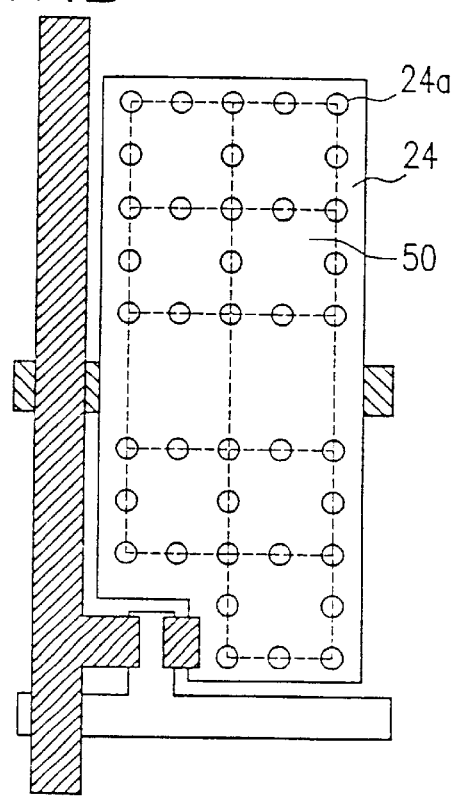
Figure 4C:
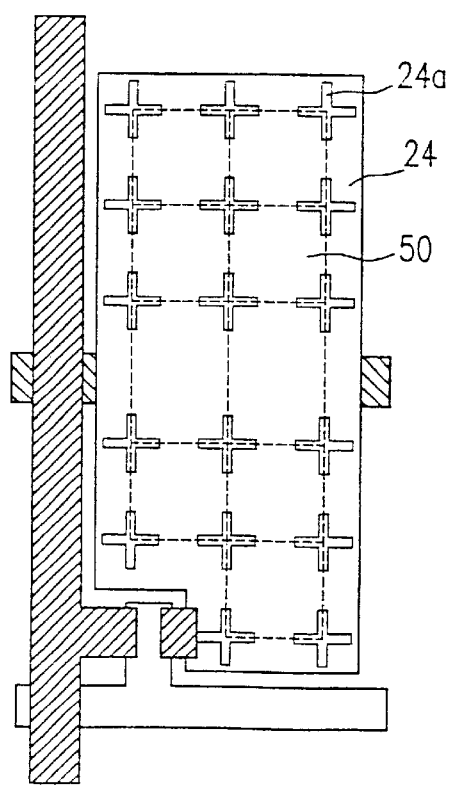
Figure 5A:
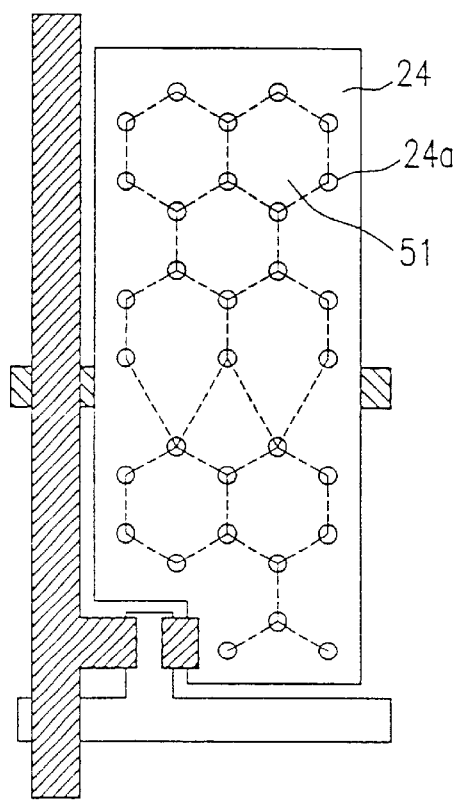
FIGS. 5A, 5B and 5C are top views of active matrix substrates, illustrating various alternative arrangements of openings of the pixel electrode in the first example.
Figure 5B:
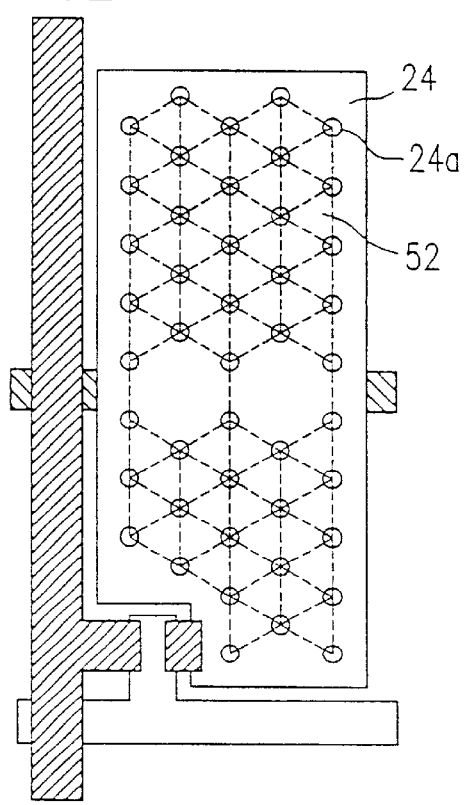
Figure 5C:
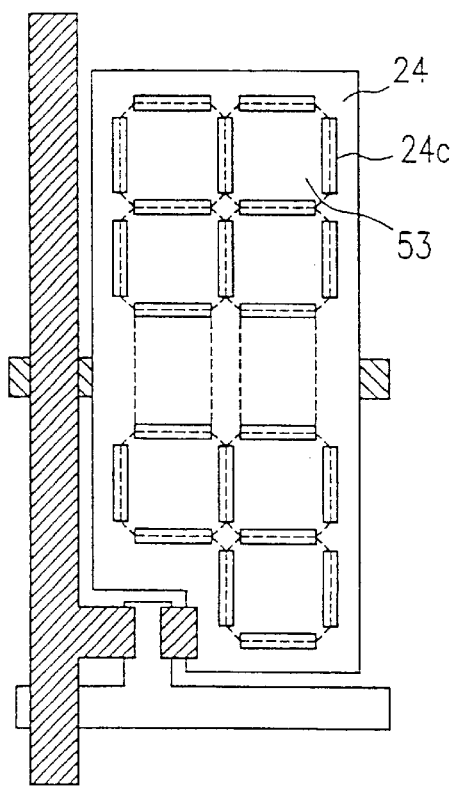

FIGS. 4A, 4B and 4C show different alternative arrangements of the sub electrode regions 50 of the pixel electrode 24 in the first example. In FIGS. 4A, 4B and 4C, the sub electrode regions 50 are quadrangular. FIGS. 5A, 5B and 5C show still different alternative arrangements of the sub electrode regions of the pixel electrode 24 in the first example. FIGS. 5A, 5B and 5C, the sub electrode regions are polygons having five or more corners.

In FIG. 5A, hexagonal sub electrode regions 51 each have the openings 24a at corners thereof In FIG. 5B, hexagonal regions each have the openings 24a at corners and at a center thereof, so that the liquid crystal molecules are aligned in an axially symmetrical manner in triangular sub electrode regions 52. In FIG. 5C, octagonal sub electrode regions 53 each have openings 24c, which are rectangular, along sides thereof. The openings 24a do not need to be circular or rectangular, but can be of any shape. The sub electrode regions (and also sub pixel regions), which preferably have high rotationary symmetry (i.e., as close as possible to a circle), are preferably equilateral polygons. The plurality of sub electrode regions (and also the sub pixel regions) are preferably arranged to have rotationary symmetry. Accordingly, it is preferable to arrange congruent equilateral polygons in a regular manner.

The sub electrode regions (and also the sub pixel regions) each can have a side of about 20 μm to about 50 μm in order to align the liquid crystal molecules in an axial symmetrical manner stably. The openings 24a, when being circular, preferably have a diameter of about 5 μm to about 20 μm. When the number of openings is excessive, the numerical aperture of the LCD device 100 is reduced. The number and arrangement (shape of the sub electrode and pixel regions) of the openings 24a need to be appropriately determined in consideration of both the viewing angle and brightness required by the use of the LCD device 100.

EXAMPLE 2

An LCD device in a second example according to the present invention will be described with reference to FIGS. 6 and 7. In this example, the pixel electrode has openings and also a recessed portion as described in detail later. FIG. 6 is a top view of an active matrix substrate 80 of the LCD device in the second example. FIG. 6 shows one pixel region of the LCD device. Unless otherwise specified, the following description will be given regarding one pixel region.

As shown in FIG. 6, the active matrix substrate 80 includes a pixel electrode 24. The pixel electrode 24 has openings 24a and a recessed portion 24b. Except for the recessed portion 24b, the structure of the LCD device in the second example is substantially identical with that of the LCD device 100 in the first example. Identical elements previously discussed with respect to FIGS. 1A, 1B, 2 and 3 bear identical reference numerals and the descriptions thereof will be omitted. The recessed portion 24b can be formed in the counter electrode in lieu of the pixel electrode 24.

FIG. 7 is a cross-sectional view of the active matrix substrate 80 taken along line VII–VII' in FIG. 6. The insulating layer 22 provided on the base plate 21 has a recessed portion. The pixel electrode 24 provided on the insulating layer 22 also has a recessed portion 24b accordingly. The recessed portion 24b has a depth of, for example, about 5 μm and a diameter of, for example, about 10 μm. The openings 24a formed in the pixel electrode 24 has a diameter of, for example, about 10 μm. The vertical alignment layer 26 is provided on the pixel electrode 24.

When no voltage is applied, the liquid crystal molecules 40a above the recessed portion 24b are aligned vertically with respect to the surface 26a of the vertical alignment layer 26. When a voltage is applied, the liquid crystal molecules 40a above the recessed portion 24b are tilted to be aligned in an axial symmetrical manner with respect to a central axis 40b of the recessed portion 24b represented by the dashed line in FIG. 7. As shown in FIG. 7, the direction of the tilt with respect to the central axis 40b is opposite to the direction of tilt of the liquid crystal molecules 40a caused by the oblique electric field around the opening 24a. More specifically, in the vicinity of the recessed portion 24b, each of the liquid crystal molecules 40a is tilted so that one end, closer to the center axis 40b of the recessed portion 24b, is higher (i.e., farther from the pixel electrode 24) than the other end, farther from the center axis 40b of the recessed portion 24b. By contrast, in the vicinity of the opening 24a, each of the liquid crystal molecules 40a is tilted so that one end, closer to the center axis 40c of the opening 24a, is lower (i.e., closer to the pixel electrode 24) than the other end, farther from the center axis 40c of the opening 24a. Accordingly, the recessed portion 24b, formed at an intermediate position between two adjacent openings 24a, stabilizes the axial symmetrical alignment of the liquid crystal molecules 40a around the openings 24a. In other words, the liquid crystal molecules 40a in the sub pixel region 60 are stably aligned in an axially symmetrical manner around the central axis 40b of the recessed portion 24b.

Returning to FIG. 6, recessed portions 24b are also formed at symmetrical positions in a peripheral region 50d around the sub electrode regions 50a, 50b and 50c. Thus, the axially symmetrical alignment of the liquid crystal molecules 40a in a peripheral region around the sub pixel regions are stabilized to secure the position of the axis of symmetry.

As can be appreciated from the above description, the recessed portions 24b and the openings 24a define sub pixel regions together. Accordingly, the recessed portions 24b are preferably located so as to form polygons congruent to the polygons formed by the openings 24a. The recessed portion 24b can have any shape in lieu of a circle.

The LCD device in the second example can be produced in a similar manner to that described in the first example. The insulating layer 22 having the recessed portion is formed by, for example, forming a silicon oxide film having a thickness of about 10 μm by sputtering or the like and then performing etching using a mask having an opening corresponding to the recessed portion. Accordingly, the pixel electrode 24 formed on the insulating layer 22 has the recessed portion 24b. The shape, size and depth of the recessed portion 24b are adjusted by the shape and size of the opening of the mask, the thickness of the insulating layer 22, and the etching amount. The recessed portion 24b preferably has a diameter of about 5 μm through about 20 μm like the opening 24a.

FIG. 8 shows a top view of one pixel region (represented as 100b in FIG. 8) of the LCD device in the second example which is observed with a polarizing microscope in a crossed nicols state. In FIG. 8, the LCD device is supplied with a voltage for gray scale display. The pixel region 100b includes subpixel regions 60a, 60b and 60c which are respectively defined by the sub electrode regions 50a, 50b and 50c in FIG. 6. A part of the pixel region 100b corresponding to the TFT 70, the gate line 72, the source line 74 (FIG. 2) and the like which block light (or a part corresponding to a black matrix) is observed to be black (hatched in FIG. 8). The openings 24a are also observed to be black. The storage capacitance common line 76 is formed of a metal material. In this example, the pixel region pitch in the longer side is about 300 μm, the pixel region pitch in the shorter side is about 100 μm, and the diameter of each opening 24a is about 10 μm.

In such an LCD device, each of a plurality of pixel regions, in its entirety, has sub regions in which the liquid crystal molecules 40a (FIG. 7) are aligned in an axially symmetrical manner. The axis of symmetry is controlled and secured by the recessed portions 24b (FIG. 6). The axis of symmetry also matches the recessed portions 24b. Accordingly, the LCD device has a high viewing angle characteristic. The response time is sufficiently short, and no image sticking phenomenon is exhibited. The axially symmetrical alignment is quite stable, and no defective alignment is generated in a repeated operation test.

Figure 9A:
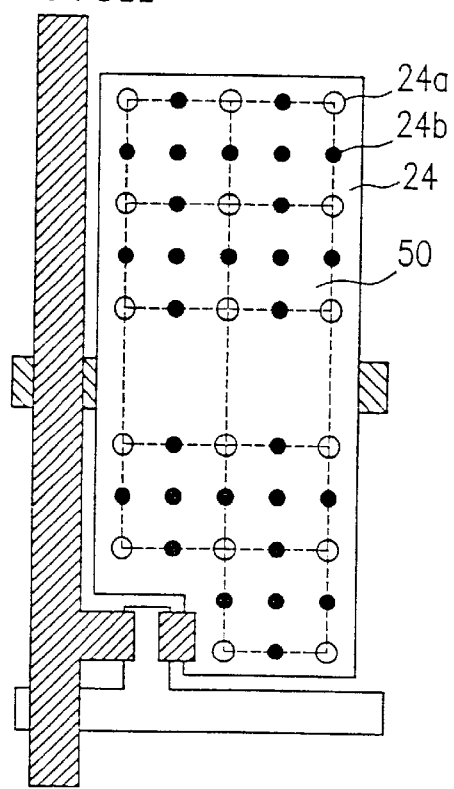
FIGS. 9A, 9B and 9C are top views of active matrix substrates, illustrating various alternative arrangements of openings of the pixel electrode in the second example.
Figure 9B:
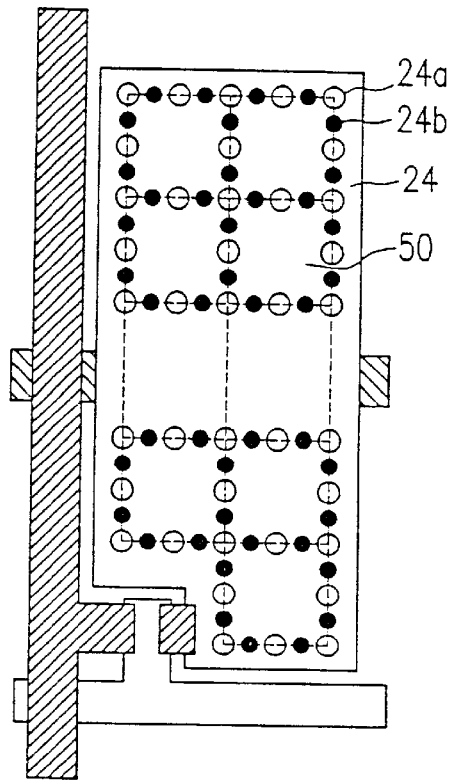
Figure 9C:
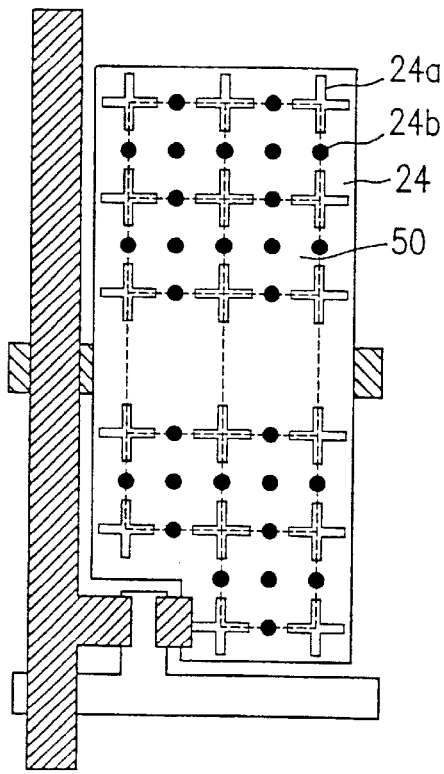
Figure 10A:
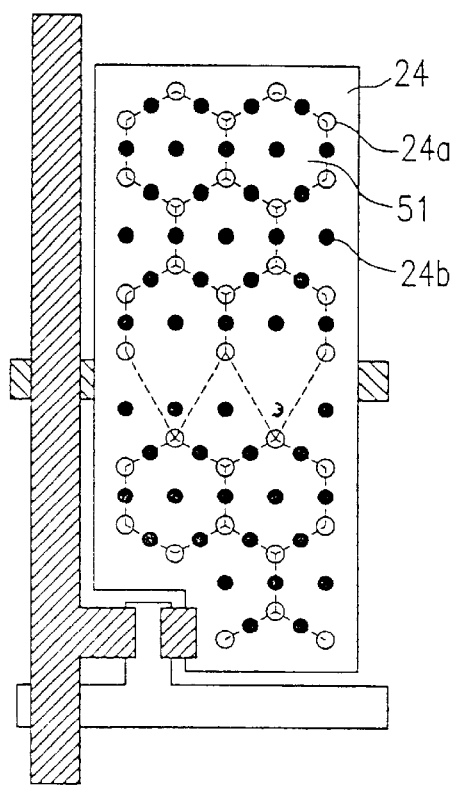
FIGS. 10A, 10B and 10C are top views of active matrix substrates, illustrating various alternative arrangements of openings of the pixel electrode in the second example.
Figure 10B:
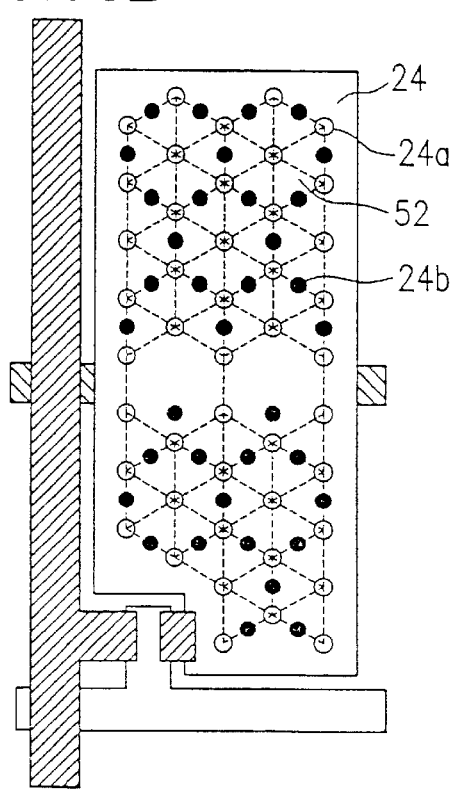
Figure 10C:
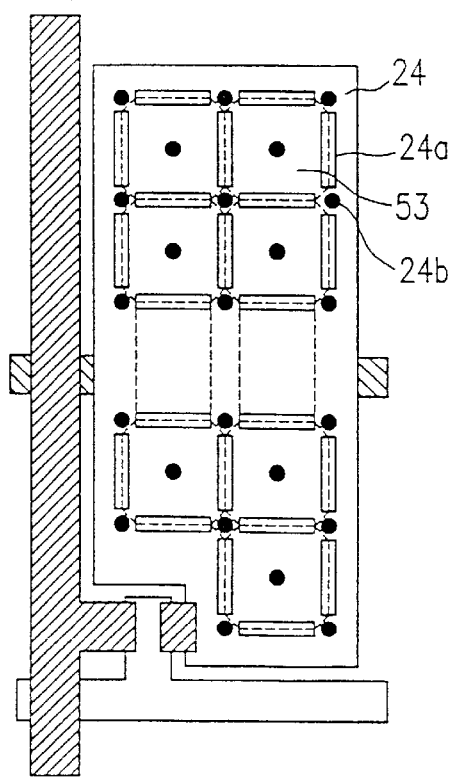

In this example, the sub electrode regions 50a, 50b and 50c are quadrangular. The sub electrode regions do not need to be quadrangular. In combination with the openings 24a shown in FIGS. 4A, 4B, 4C, the recessed portions 24b shown in FIGS. 9A, 9B and 9C can be formed, respectively. In combination with the openings 24a shown in FIGS. 5A, 5B, 5C, the recessed portions 24b shown in FIGS. 10A, 10B and 10C can be formed, respectively. The recessed portions 24b act to secure and stabilize the center for axial symmetry. Therefore, the recessed portions 24b are each preferably formed at an intermediate position between two adjacent openings 24a. Furthermore, the recessed portions 24b are preferably formed so as to form polygons congruent to the polygons formed by the openings 24a. The recessed portions 24b in a peripheral region 50d (FIG. 6) are preferably located so as to form polygons congruent to the polygons formed by the recessed portions 24b in the sub electrode region 50.

When the recessed portions 24b are formed, the sub pixel region 60 can have a side of about 50 μm to about 100 μm in order to stabilize the axially symmetrical alignment of the liquid crystal molecules. The shape and number of the recessed portions 24b can be appropriately determined in consideration of both the viewing angle and brightness required by the use of the LCD device.

EXAMPLE 3

Figure 11:
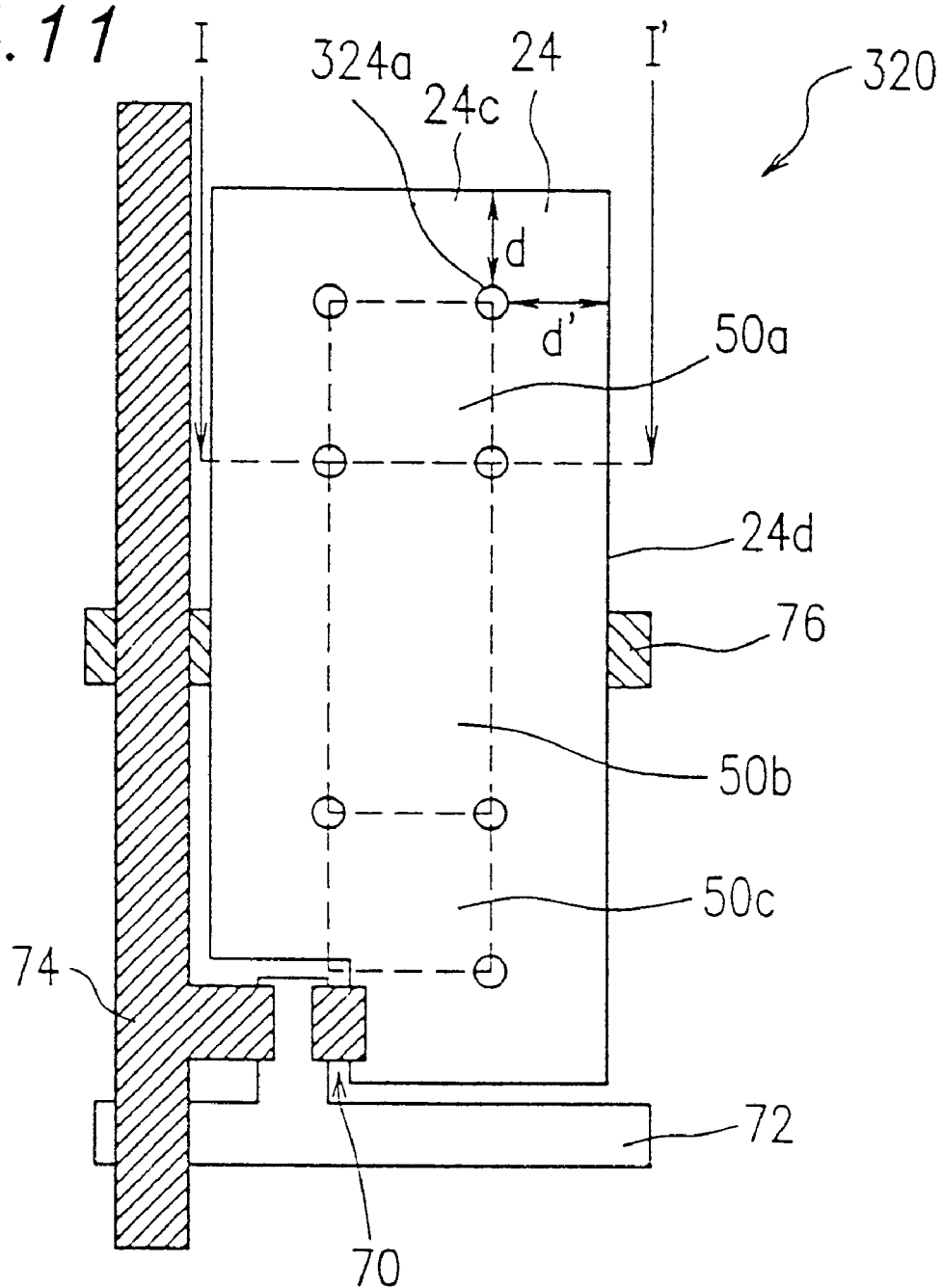
FIG. 11 is a top view of an active matrix substrate of an LCD device in a third example according to the present invention.

An LCD device in a third example according to the present invention will be described. FIG. 11 is a top view of an active matrix substrate 320 of the LCD device in the third example. FIG. 11 shows one pixel region of the LCD device. Unless otherwise specified, the following description will be given regarding one pixel region. In the active matrix substrate 320, distance d from an edge 24c of the pixel electrode 24 to an opening 324a, which is closest to the edge 24c, and distance d' from an edge 24d to the opening 324a (also closest to the edge 24d) are both about 5 μm. Except for this point, the LCD device in the third example is substantially identical with the LCD device 100 in the first example. Identical elements previously discussed with respect to FIGS. 1A, 1B, 2 and 3 bear identical reference numerals and the descriptions thereof will be omitted.

Distances d and d' are not limited to about 5 μm, but are preferably about 2 μm or more. More preferably, distances d and d' are about 2 μm to about 10 μm. When distances d and d' are less than about 2 μm, the axially symmetrical alignment of the liquid crystal molecules is disturbed by a lateral (horizontal) electric field due to a scanning line or a signal line (bus line) located in the vicinity of a plurality of pixel electrodes 24 arranged in a matrix. When distances d and d' are more than about 10 μm, an area of the pixel electrode 24 contributing to the display is excessively reduced, and thus light transmittance of the LCD device is excessively reduced.

The LCD device in the third example can be produced in a similar manner to that described in the first example.

When one pixel region of the LCD device in the third example supplied with a voltage for gray scale display is examined by a polarizing microscope in a crossed nicols state, the liquid crystal molecules are observed to be in a similar state to the state described in the first example.

In such an LCD device, each of a plurality of pixel regions, in its entirety, has sub regions in which the liquid crystal molecules are aligned in an axially symmetrical manner. Accordingly, the LCD device has a high viewing angle characteristic. The response time is sufficiently short, and no image sticking phenomenon is exhibited. The axially symmetrical alignment is quite stable, and no defective alignment is generated in a repeated operation test.

In this example, the sub electrode regions 50$a$, 50$b$ and 50$c$ are quadrangular. The sub electrode regions do not need to be quadrangular, but can be a polygon having openings at corners or along and overlapping sides thereof.

Figure 12A:
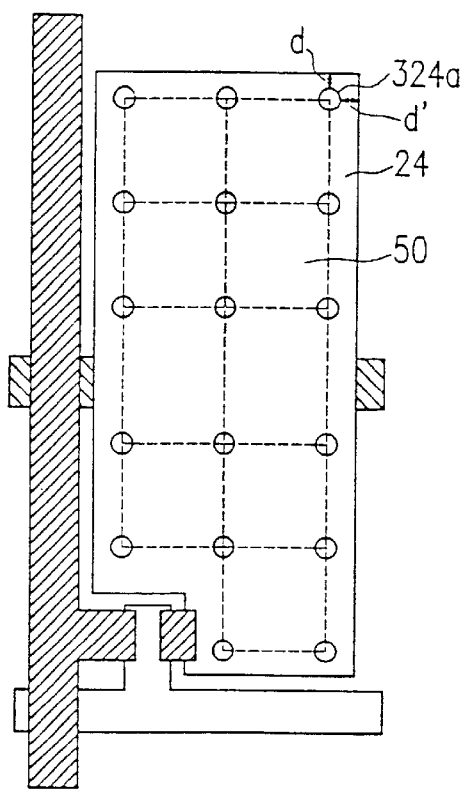
FIGS. 12A, 12B and 12C are top views of active matrix substrates, illustrating various alternative arrangements of openings of the pixel electrode in the third example.
Figure 12B:
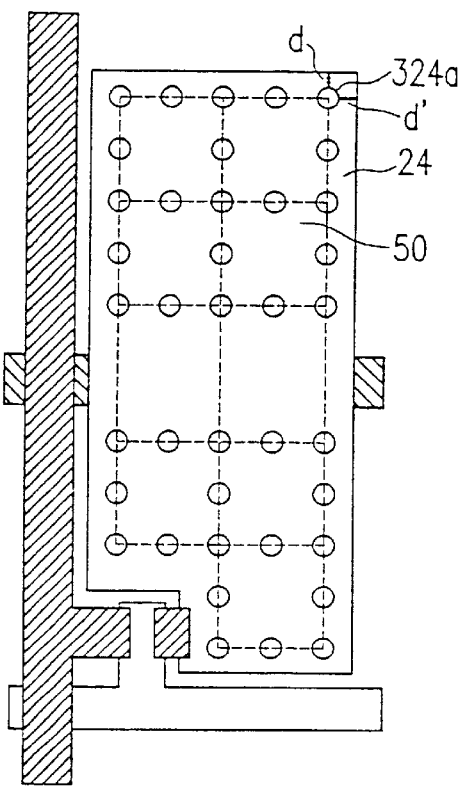
Figure 12C:
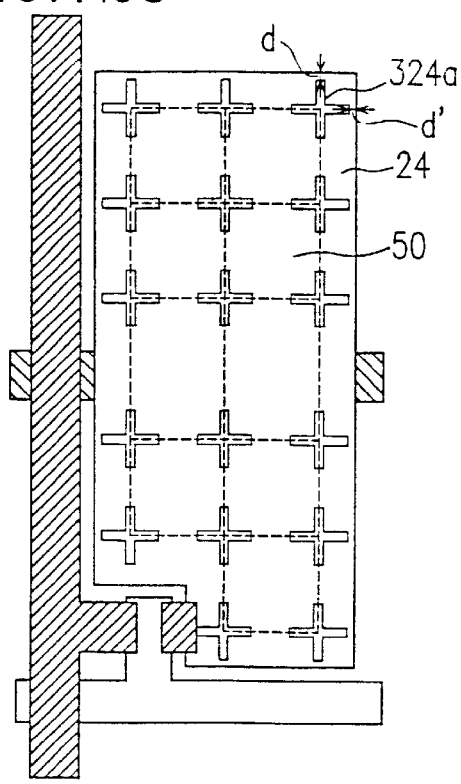
Figure 13A:
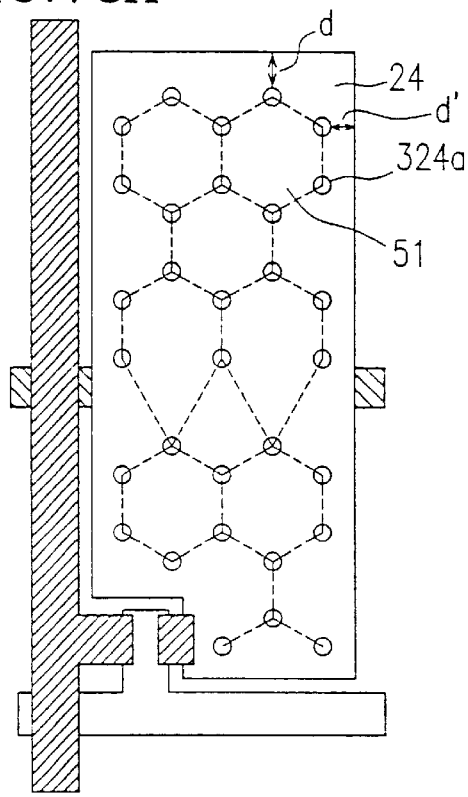
FIGS. 13A, 13B and 13C are top views of active matrix substrates, illustrating various alternative arrangements of openings of the pixel electrode in the third example.
Figure 13B:
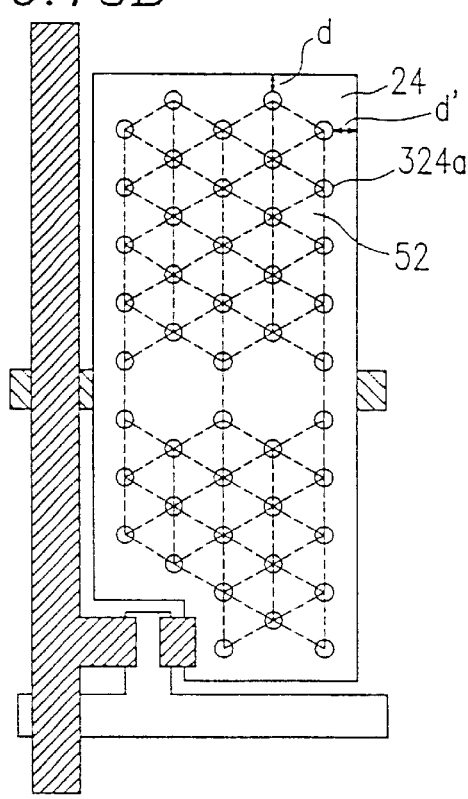
Figure 13C:
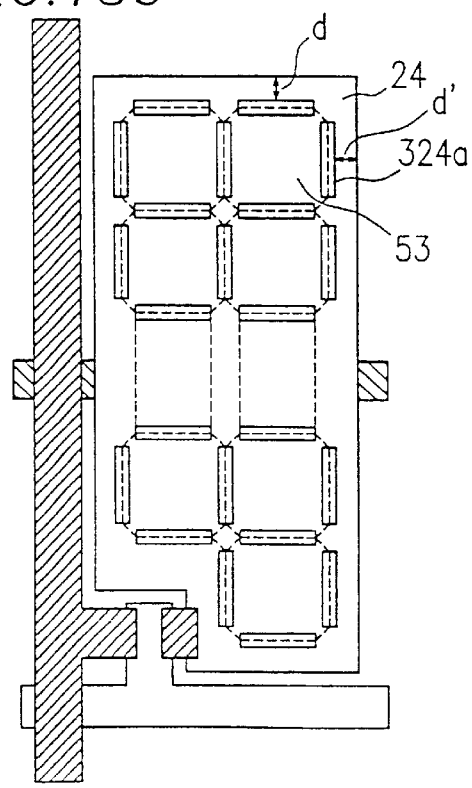

FIGS. 12A, 12B and 12C show different alternative arrangements of the sub electrode regions 50 of the pixel electrode 24 in the third example. In FIGS. 12A, 12B and 12C, the sub electrode regions 50 are quadrangular. FIGS. 13A, 13B and 13C show still different alternative arrangements of the sub electrode regions 50 of the pixel electrode 24 in the third example. In FIGS. 13A, 13B and 13C, the sub electrode regions are polygons having five or more corners.

In FIG. 13A, hexagonal sub electrode regions 51 each have the openings 324$a$ at corners thereof. In FIG. 13B, hexagonal regions each have the opening 324$a$ at corners and at a center thereof, so that the liquid crystal molecules are aligned in an axially symmetrical manner in triangular sub electrode regions 52. In FIG. 13C, octagonal sub electrode regions 53 each have openings 324$a$, which are rectangular, along sides thereof. The openings 324$a$ do not need to be circular or rectangular, but can be of any shape. The sub electrode regions (and also sub pixel regions), which preferably have high rotationary symmetry (i.e., as close as possible to a circle), are preferably equilateral polygons. The plurality of sub electrode regions (and also the sub pixel regions) are preferably arranged to have rotationary symmetry. Accordingly, it is preferable to arrange congruent equilateral polygons in a regular manner.

The sub electrode regions (and also the sub pixel regions) each can have a side of about 20 $\mu$m to about 50 $\mu$m in order to align the liquid crystal molecules in an axial symmetrical manner stably. As described above, distance d between the edge 24$c$ and the opening 324$a$ closest to the edge 24$c$ and distance d' between the edge 24$c$ and the opening 324$a$ (also closest to the edge 24$d$) are each preferably about 2 $\mu$m or more, and more preferably about 2 $\mu$m to about 10 $\mu$m. The openings 324$a$, when being circular, preferably have a diameter of about 5 $\mu$m to about 20 $\mu$m. When the number of openings is excessive, the numerical aperture of the LCD device is reduced. The number and arrangement (shape of the sub electrode and pixel regions) of the openings 324$a$ need to be appropriately determined in consideration of both the viewing angle and brightness required by the use of the LCD device.

In the LCD device in the third example, recessed portions regularly arranged in each pixel region can be formed in at least one of the pixel electrode or the counter electrode as the LCD device in the second example.

EXAMPLE 4

A LCD device 400 in a fourth example according to the present invention will be described. FIGS. 14A and 14B are schematic cross-sectional views of the LCD device 400. FIG. 14A shows the state when no voltage is applied, and FIG. 14B shows the state when a voltage is applied. FIGS. 14A and 14B show one pixel region of the LCD device 400. Unless otherwise specified, the following description will be given regarding one pixel region. As shown in FIGS. 14A and 14B, the LCD device 400 includes an active matrix substrate 420, a counter substrate 30, and a liquid crystal layer 40 interposed therebetween.

In the LCD device 400, openings 424$a$, which are circular in this example, are formed in the pixel electrode 24 (e.g., the lower right corner of the sub electrode region 50$a$ in FIG. 15) and also along and overlapping edges or at corners of the pixel electrode 24 (e.g., the lower left corner, upper left corner and upper right corner of the sub electrode region 50$a$). Except for this point, the LCD device 400 has a substantially identical structure with that of the LCD device 100. Identical elements previously discussed with respect to FIGS. 1A, 1B, 2 and 3 bear identical reference numerals and the descriptions thereof will be omitted.

When no voltage is applied to the liquid crystal layer 40 as shown in FIG. 14A, the liquid crystal molecules 40$a$ are aligned vertically to surfaces 26$a$ and 36$a$ of the vertical alignment layers 26 and 36 by the alignment force thereof. When a voltage is applied to the liquid crystal layer 40 as shown in FIG. 14B, the liquid crystal molecules 40$a$, which have a negative dielectric anisotropy, are aligned so that longitudinal axes thereof are vertical with respect to an electric line of force E. In the vicinity of the openings 424$a$, the electric line of force E is inclined with respect to the surfaces 21$a$ and 31$a$ of the base plates 21 and 31 (substantially parallel to the surfaces 26$a$ and 36$a$ of the vertical alignment layers 26 and 36 ). Accordingly, the liquid crystal molecules 40$a$ in the vicinity of the openings 424$a$ are aligned radially around each opening 424$a$. The liquid crystal molecules 40$a$ farther from the opening 424$a$ are tilted at a greater angle with respect to the line normal to the surfaces 21$a$ and 31$d$ than the liquid crystal molecules 40$a$ closer to the opening 424$a$. Thus, the liquid crystal molecules 40$a$ in the sub pixel region 60 are aligned in an axially symmetrical manner.

FIG. 15 is a top view of the active matrix substrate 420 of the pixel region of the LCD device 400 shown in FIGS. 14A and 14B. FIGS. 14A and 14B illustrate the cross-section taken along lines XIV–XIV' in FIG. 15.

As described above, the pixel electrode 24 has the plurality of openings 424$a$. The openings 424$a$ will be described in detail with reference to FIG. 15. As shown in FIG. 15, the openings 424$a$ are formed in the pixel electrode 24 (e.g., the lower right corner of the sub electrode region 50$a$ in FIG. 15) and also along and overlapping edges or at corners of the pixel electrode 24 (e.g., the lower left corner, upper left corner and upper right corner of the sub electrode region 50$a$). The openings 424$a$ define sub electrode regions 50$a$ through 50$i$ (nine regions in this example). The sub electrode regions 50$a$ through 50$i$ have the openings 424$a$ at corners thereof. The sub electrode regions 50$a$, 50$b$, 50$c$ and 50$d$ are square having a four-fold axis of symmetry) at a center thereof and are congruent to one another. The sub electrode regions 50$e$ and 50$f$ are rectangular (having a two-fold axis of symmetry) at a center thereof. The sub electrode region 50$e$ shares one side with each of the sub electrode regions 50$c$, 50$f$ and 50$g$. The sub electrode region 50$f$ shares one side with each of the sub electrode regions 50$d$, 50$e$ and 50$h$.

In FIG. 15, four edges of the pixel electrode 24 match one side of each of the sub electrode regions 50$a$ through 50$i$.

Such an arrangement substantially prevents disclination, which is caused near the edges of the pixel electrode by a distance between a side of the sub electrode region and an edge of the pixel electrode. The reason for this is that, as shown in FIG. 14B, the direction of tilt of the liquid crystal molecules 40a continuously changes in the direction of arrow A (i.e., from the center to the edge of the pixel electrode 24).

The LCD device 400 in the fourth example can be produced in a similar manner to that in the first example.

FIG. 16 shows a top view of one pixel region (represented as 400a in FIG. 16) of the LCD device 400 shown in FIG. 15 which is observed with a polarizing microscope in a crossed nicols state. In FIG. 16, the LCD device 400 is supplied with a voltage for gray scale display. The pixel region 400a includes sub pixel regions 60a through 60i which are respectively defined by the sub electrode regions 50a through 50i in FIG. 15. A part of the pixel region 400a corresponding to the TFT 70, the gate line 72, the source line 74 (FIG. 15) and the like which block light (or a part corresponding to a black matrix) is observed to be black (hatched in FIG. 16). The openings 424a are also observed to be black. The storage capacitance common line 76 is formed of a transparent material. In this example, the pixel region pitch in the longer side is about 300 μm, the pixel region pitch in the shorter side is about 100 μm, and the diameter of each opening 424a is about 10 μm.

As can be appreciated from FIG. 16, the sub pixel regions 60a through 60i are observed to have a crossed extinction pattern, which demonstrates that the liquid crystal molecules are aligned in an axially symmetrical manner. In the sub pixel regions 60a through 60d defined by the square sub electrode regions 50a through 50d (FIG. 15), an extinction pattern having a four-fold axis of symmetry is observed. In the sub pixel regions 60e and 60f defined by the rectangular sub electrode regions 50e and 50f (FIG. 15), an extinction pattern having a two-fold axis of symmetry is observed.

In such an LCD device 400, each of a plurality of pixel regions, in its entirety, has sub regions in which the liquid crystal molecules 40a (FIGS. 14A and 14B) are aligned in an axially symmetrical manner. Accordingly, the LCD device 400 has a high viewing angle characteristic. The response time is sufficiently short, and no image sticking phenomenon is exhibited. The axially symmetrical alignment is quite stable, and no defective alignment is generated in a repeated operation test.

In this example, the sub electrode regions 50a through 50i are quadrangular. The sub electrode regions do not need to be quadrangular, but can be a polygon having openings at corners or along and overlapping sides thereof. The sub electrode regions can be a triangle, but preferably is a polygon having four or more corners in order to provide a uniform dependency on the azimuth angle of the viewing characteristic. A square is more advantageous than a rectangle since a square has higher rotationary symmetry and thus provides a more uniform viewing characteristic than a rectangle.

Figure 17A:
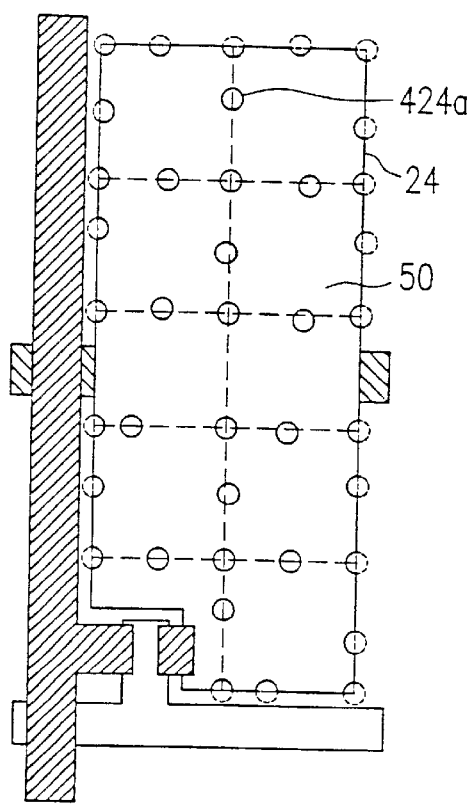
FIGS. 17A, 17B and 17C are top views of active matrix substrates, illustrating various alternative arrangements of openings of the pixel electrode in the fourth example.
Figure 17B:
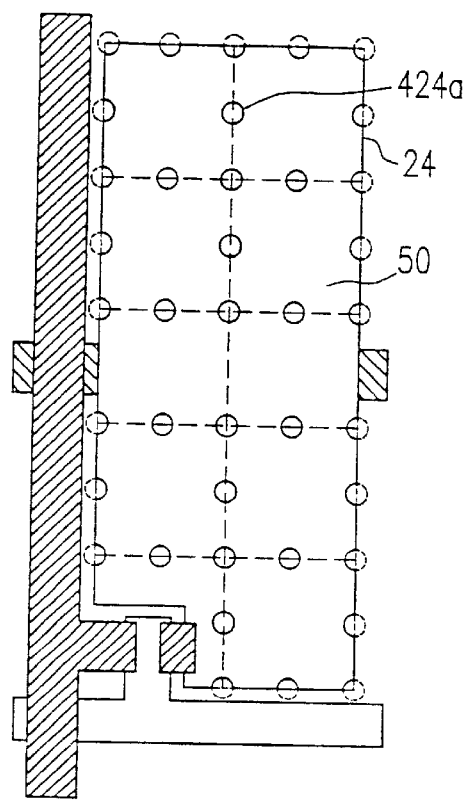
Figure 17C:
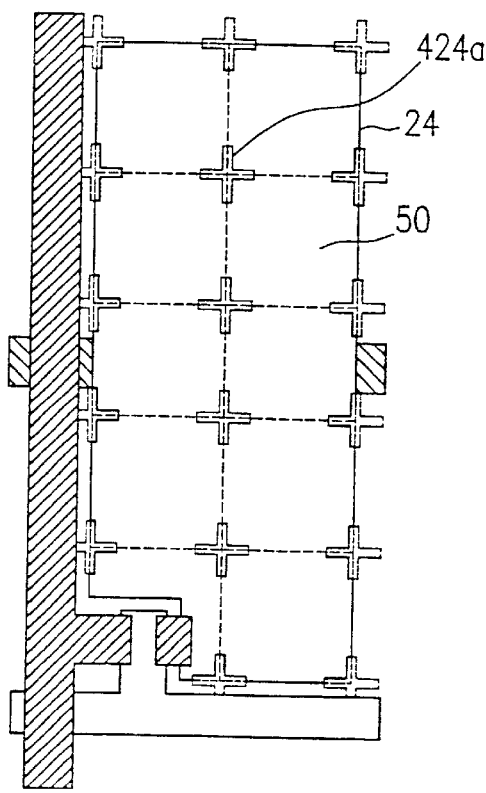
Figure 18A:
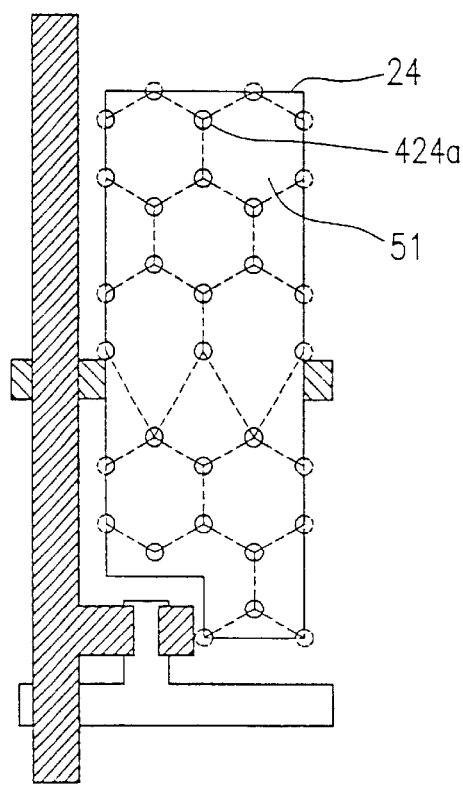
FIGS. 18A, 18B and 18C are top views of active matrix substrates, illustrating various alternative arrangements of openings of the pixel electrode in the fourth example.
Figure 18B:
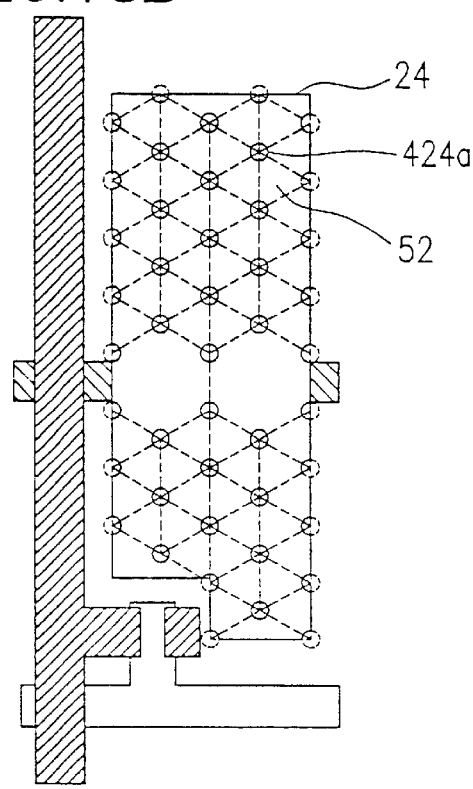
Figure 18C:
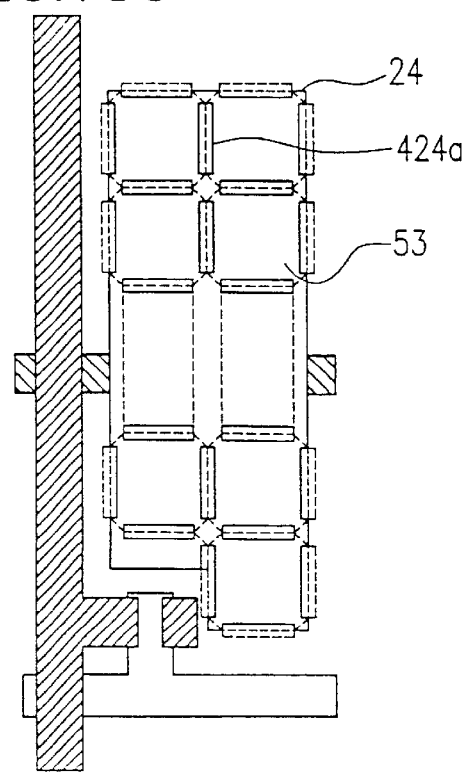

FIGS. 17A, 17B and 17C show different alternative arrangements of the sub electrode regions 50 of the pixel electrode 24 in the fourth example. In FIGS. 17A, 17B and 17C, the sub electrode regions 50 are quadrangular. FIGS. 18A, 18B and 18C show still different alternative arrangements of the sub electrode regions of the pixel electrode 24 in the fourth example. In FIGS. 18A, 18B and 18C, the sub electrode regions are polygons having five or more corners.

In FIG. 18A, hexagonal sub electrode regions 51 each have the openings 424a at corners thereof. In FIG. 18B, hexagonal regions each have the openings 424a at corners and at a center thereof, so that the liquid crystal molecules are aligned in an axially symmetrical manner in triangular sub electrode regions 52. In FIG. 18C, octagonal sub electrode regions 53 each have openings 424a, which are rectangular, along sides thereof. The openings 424a do not need to be circular or rectangular, but can be of any shape. The sub electrode regions (and also sub pixel regions), which preferably have high rotationary symmetry (i.e., as close as possible to a circle), are preferably equilateral polygons. The plurality of sub electrode regions (and also the sub pixel regions) are preferably arranged to have rotationary symmetry. Accordingly, it is preferable to arrange congruent equilateral polygons in a regular manner. In either case, the effect of this example can be obtained where at least one side of at least one sub electrode region matches at least one of the edges of pixel electrode 24.

In the LCD device 400 in the fourth example, recessed portions regularly arranged in each pixel region can be formed in at least one of the pixel electrode 24 or the counter electrode 34 as the LCD device 400 in the second example.

In the LCD device in the third example, the openings in the pixel electrode are distanced from the edges of the pixel electrode. In the LCD device 400 in the fourth example, a side of the sub electrode region matches an edge of the pixel electrode. The arrangement of the openings with respect to the edges of the pixel electrode can be appropriately selected in accordance with the use of the LCD device.

EXAMPLE 5

An LCD device 500 in a fifth example according to the present invention includes an alignment fixing layer in at least one of first and second substrates in contact with the liquid crystal layer 40 as described in detail below.

Figure 19A:
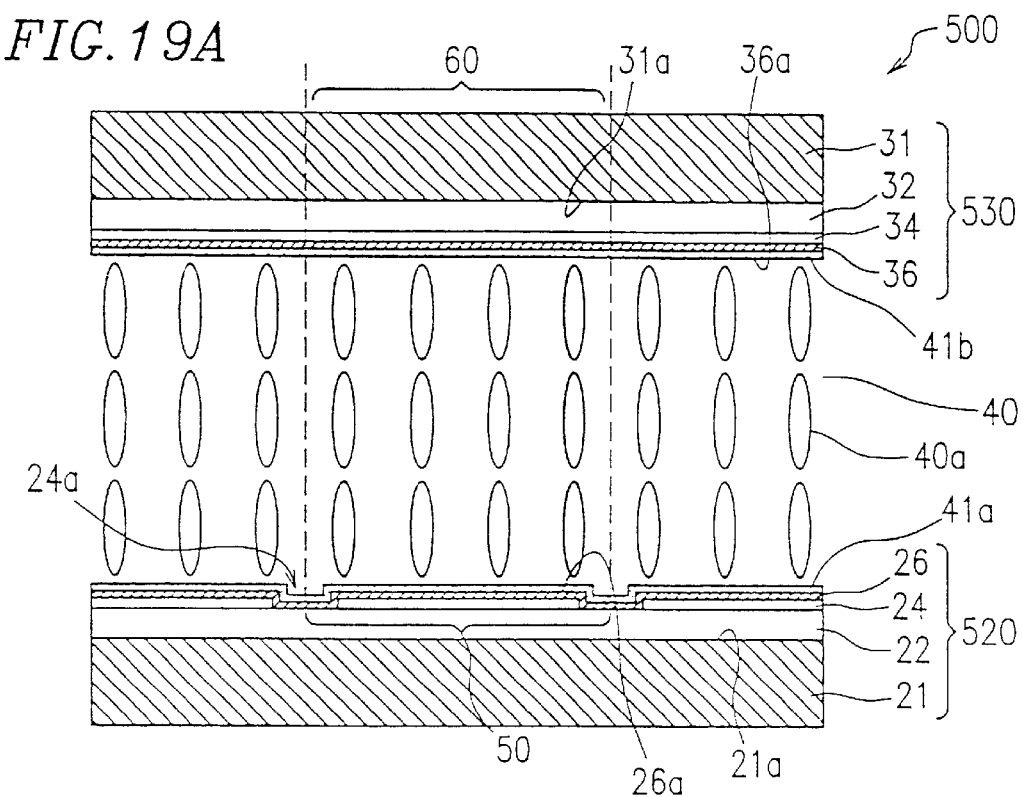
FIG. 19A is a cross-sectional view of an LCD device in a fifth example according to the present invention, illustrating the state when no voltage is applied.
Figure 19B:
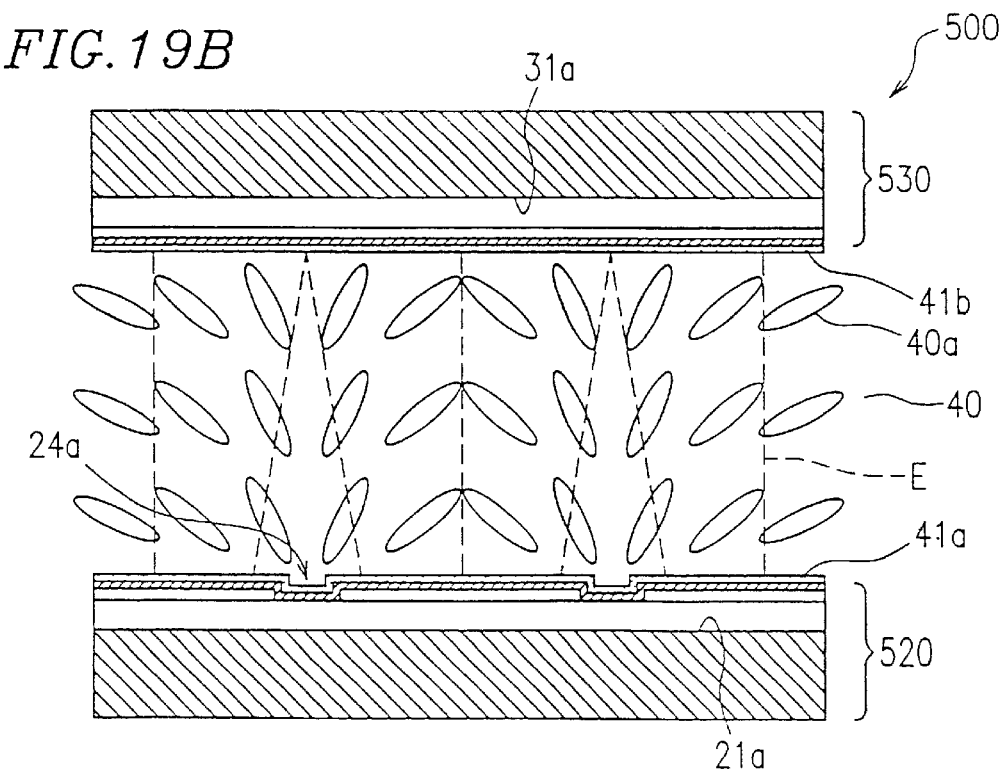
FIG. 19B is a cross-sectional view of the LCD device shown in FIG. 19A, illustrating the state when a voltage is applied.

FIGS. 19A and 19B are schematic cross-sectional views of the LCD device 500. FIG. 19A shows the state when no voltage is applied, and FIG. 19B shows the state when a voltage is applied. FIGS. 19A and 19B show one pixel region of the LCD device 500. Unless otherwise specified, the following description will be given regarding one pixel region.

The LCD device 500 includes an active matrix substrate 520, a counter substrate (color filter substrate) 530, and a liquid crystal layer 40 interposed between the active matrix substrate 520 and the counter substrate 530. The active matrix substrate 520 includes a transparent base plate 21, an insulating layer 22, a pixel electrode 24, an alignment layer 26, and an alignment fixing layer 41a. The insulating layer 22, the pixel electrode 24, the alignment layer 26, and the alignment fixing layer 41a are sequentially provided in this order on a surface 21a of the base plate 21, the surface 21a facing the liquid crystal layer 40. The counter substrate 530 includes a transparent base plate 31, a color filter layer 32, a counter electrode 34, an alignment layer 36, and an alignment fixing layer 41b. The color filter layer 32, the counter electrode 34, the alignment layer 36, and the alignment fixing layer 41b are provided in this order on a surface 31a of the base plate 31, the surface 31a facing the liquid crystal layer 40. Except for the alignment fixing layers 41a and 41b, the LCD device 500 has a substantially identical structure as that of the LCD device 100. Identical elements previously discussed with respect to FIGS. 1A, 1B, 2 and 3 bear identical reference numerals and the descriptions thereof will be omitted.

The pixel electrode 24 has a plurality of openings 24a, for example, as shown in FIG. 2. The plurality of openings 24a defines a polygonal sub electrode region 50 having the openings 24a at corners or along and overlapping sides thereof. The liquid crystal molecules 40a in a sub pixel region 60 defined by a sub electrode region 50 are aligned in an axially symmetrical manner by the action of the openings 24a. The openings 24a can be arranged as shown in FIGS. 4A through 4C, 5A through 5C, 11, 12A through 12C, 13A through 13C, 15, 17A through 17C, and 18A through 18C.

When no voltage is applied to the liquid crystal layer 40 as shown in FIG. 19A, the liquid crystal molecules 40a are aligned vertically to surfaces 26a and 36a of the vertical alignment layers 26 and 36 by the alignment force thereof. When a voltage is applied to the liquid crystal layer 40 as shown in FIG. 19B, the liquid crystal molecules 40a, which have a negative dielectric anisotropy, are aligned so that longitudinal axes thereof are vertical with respect to an electric line of force E. In the vicinity of the openings 24a, the electric line of force E is inclined with respect to the surfaces 21a and 31a of the base plates 21 and 31 (substantially parallel to the surfaces 26a and 36a of the vertical alignment layers 26 and 36). Accordingly, the liquid crystal molecules 40a in the vicinity of the openings 24a are aligned radially around each opening 24a. The liquid crystal molecules 40a farther from the opening 24a are tilted at a greater angle with respect to the line normal to the surfaces 21a and 31a than the liquid crystal molecules 40a closer to the opening 24a. Thus, the liquid crystal molecules 40a in the sub pixel region 60 are aligned in an axially symmetrical manner. The alignment fixing layers 41a and 41b uniformly and stably maintain pretilt of the axial symmetrical alignment of the liquid crystal molecules in the sub pixel region 60 caused when a voltage is applied to the LCD device 500. The alignment fixing layers 41a and 41b also maintain the pretilt when no voltage is applied. The alignment fixing layers 41a and 41b maintain the axially symmetrical alignment even after the power is turned off.

The LCD device 500 in the fifth example can be produced in, for example, the following manner. The active matrix substrate 520 can be produced by a known method used for producing an active matrix substrate, except that the pixel electrode 24 is formed by using a pattern which causes the openings 24a as shown in FIG. 2 to be formed. Thus, the active matrix substrate 520 can be produced without increasing the number of production steps. The counter substrate 30 can also be produced by a known method. The pixel electrode 24 and the counter electrode 34 are formed of, for example, ITO (indium tin oxide) to have a thickness of about 50 nm.

The laminate including the base plate 21, the insulating layer 22 and the pixel electrode 24 is coated with the vertical alignment layer 26 by printing. The laminate including the base plate 31, the color filter layer 32 and the counter electrode 34 is coated with the vertical alignment layer 36 by printing. The vertical alignment layers 26 and 36 are formed of a polyimide-based material (for example, JALS-204, Japan Synthetic Rubber Co., Ltd.) Alternatively, the vertical alignment layers 26 and 36 can be formed of various other materials which cause liquid crystal molecules to be aligned vertically with respect to the surfaces 26a and 36a of the vertical alignment layers 26 and 36. Such materials include, for example, octadecyl ethoxysilane and lecithin.

Then, plastic beads having a diameter of about 4.5 μm are distributed on the vertical alignment layer 26. On the vertical alignment layer 36, a seal section formed of an epoxy resin including fiber glass is formed along a periphery of a display area by screen printing. The resultant laminates are bonded together and cured by heating. Next, a mixture of a liquid crystal material, a photocurable resin (0.3% by weight), and a photoinitiator (0.1% by weight) is injected into a gap between the active matrix substrate 520 and the counter substrate 530 using vacuum injection, thereby forming the liquid crystal layer 40. The liquid crystal material has a negative dielectric anisotropy (Δ∈=−4.0, Δn=0.08). The photocurable resin can be represented by the following chemical formula. The photo initiator can be, for example, Irgacure651 (Ciba-Geigy Corporation).

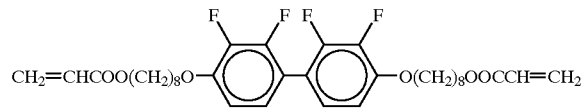

When a voltage of, for example, about 5 V is applied between the pixel electrode 24 and the counter electrode 34, the liquid crystal molecules 40a, which have been vertically aligned to the surfaces 26a and 36a of the vertical alignment layers 26 and 36, are tilted toward a direction parallel to the surfaces 26a and 36a (i.e., vertical to the electric field). Thus, the liquid crystal molecules 40a are aligned in an axially symmetrical manner with respect to the center axis of each opening 24a.

When the liquid crystal layer 40 is irradiated with ultraviolet rays (6 mW/cm$^2$, 365 nm) for about 10 minutes at room temperature (25° C.) while applying a voltage of about 2.2 V, which is about 0.3 V higher than a threshold voltage, between the pixel electrode 24 and the counter electrode 34, the photocurable resin in the mixture is cured. Thus, the alignment fixing layers 41a and 41b are formed. Thus, the LCD device 500 is completed. The threshold voltage is a voltage at which the light transmittance is 10% in the voltage-light transmittance curve of an LCD device.

The alignment fixing layers 41a and 41b define the pretilt and alignment direction of the axially symmetrical alignment. The voltage applied during the ultraviolet irradiation is preferably about 0.2 V to about 0.5 V higher, and more preferably about 0.3 V to about 0.4 V higher than the threshold voltage. When the voltage is excessively low with respect to the threshold voltage, the alignment force generated by the alignment fixing layers 41a and 41b is not sufficiently large. When the voltage is excessively high, the alignment is excessively fixed, thus causing an image sticking phenomenon or the like. By forming the alignment fixing layers 41a and 41b while applying an appropriate voltage, the axially symmetrical alignment of the liquid crystal molecules 40a can be rapidly reproduced.

Such a structure does not require projections to be provided in the liquid crystal layer 40 in order to stabilize the liquid crystal molecules 40a. Therefore, the number of production steps or production cost is not increased, or the numerical aperture is not reduced.

In such an LCD device 500, each of a plurality of pixel regions, in its entirety, has sub regions in which the liquid crystal molecules 40a are aligned in an axially symmetrical manner. Accordingly, the LCD device 500 has a high viewing angle characteristic. The response time is sufficiently short, and no image sticking phenomenon is exhibited. The axially symmetrical alignment is quite stable, and no defective alignment is generated in a repeated operation test. In this example, the alignment fixing layers 41a and 41b are provided on the active matrix substrate 520 and the counter substrate 530. The alignment fixing layer can be provided in either substrate.

EXAMPLE 6

Figure 20A:
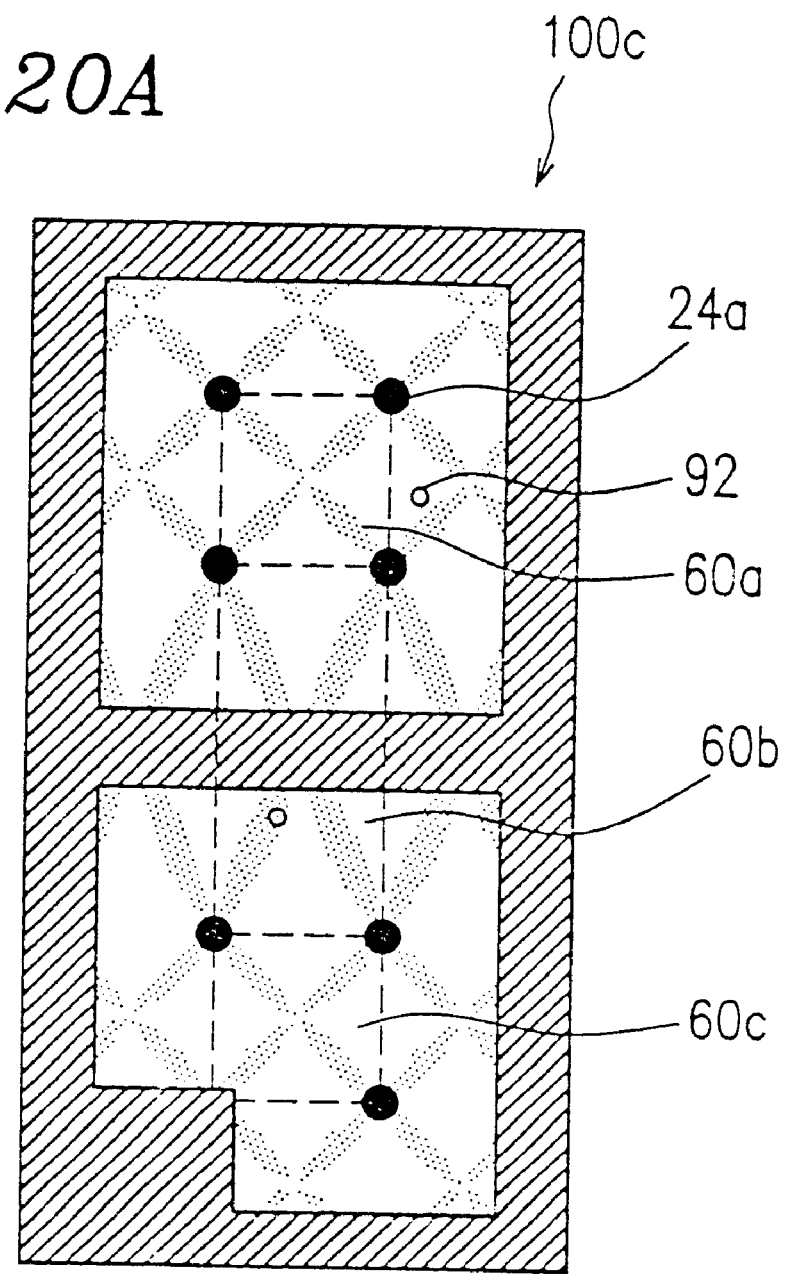

In the first through fifth examples, the spacers for controlling the thickness of the liquid crystal layer 40 are formed of plastic beads, which are distributed on the active matrix substrate. FIG. 20A shows the alignment of the liquid crystal molecules in a pixel region 100c when the openings 24a are a distance away from the edges of the pixel electrode. FIG. 20B shows the alignment of the liquid crystal molecules in a pixel region 400C when the openings 424a are along and overlapping the edges of the pixel electrode. When plastic beads 92 are in the pixel region 100c or 400c, the axially symmetrical alignment of the liquid crystal molecules in at least one of the sub pixel regions (60a through 60c in FIG. 20A, 60a through 60i in FIG. 20B) may undesirably be disturbed. In order to prevent the disturbance in the alignment caused by the plastic beads 92, an LCD device in a sixth example according to the present invention includes a column-like projection formed of a polymer provided in a position in the pixel region at which the column-like projection does not influence the display.

Figure 21A:
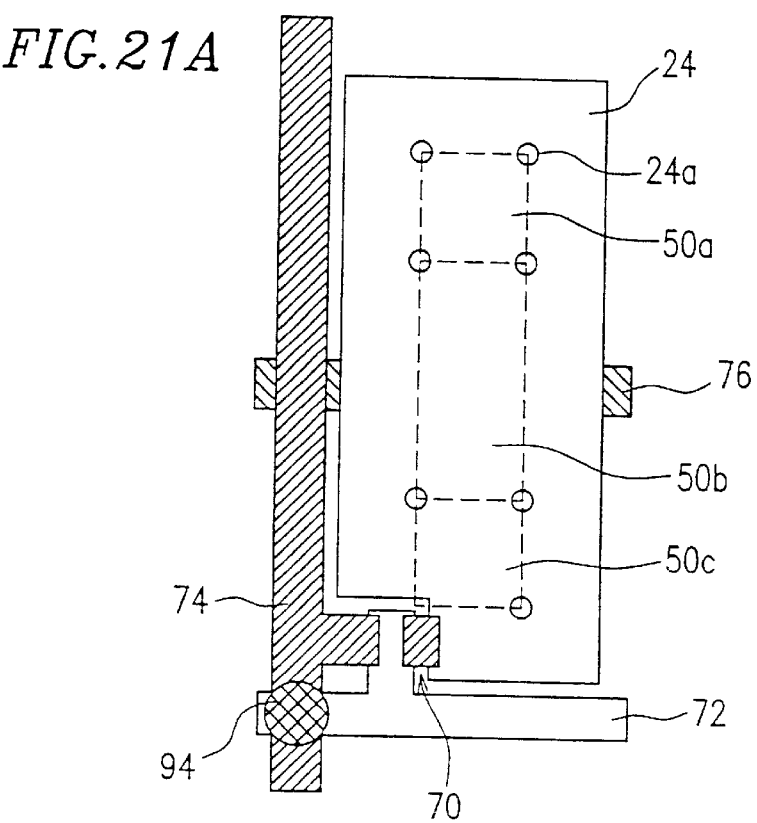
FIGS. 21A, 21B, 21C and 21D are each a top view of an active matrix substrate in a sixth example according to the present invention, each substrate including a column-like projection.
Figure 21B:
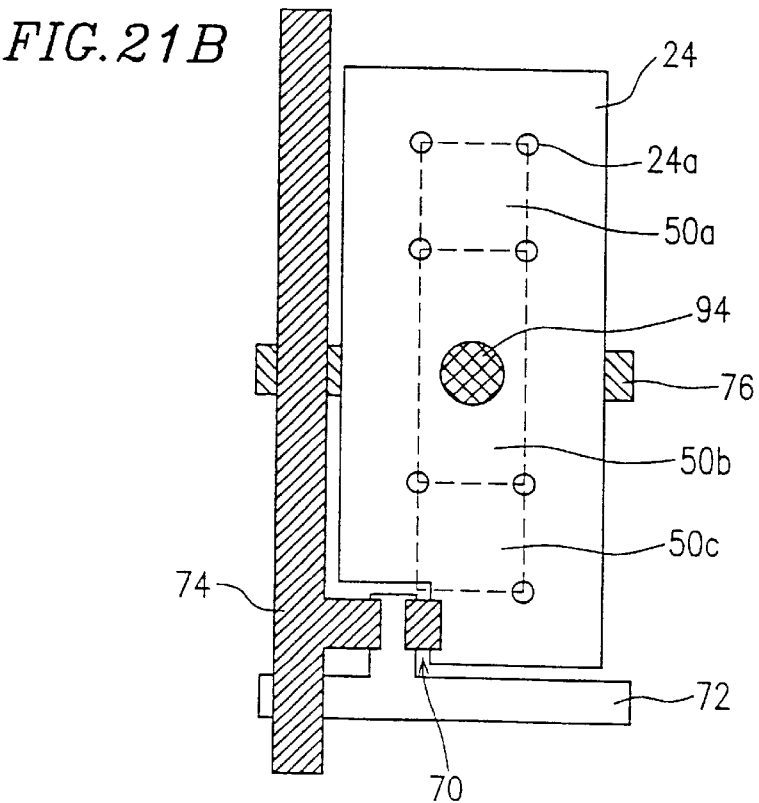
Figure 21C:
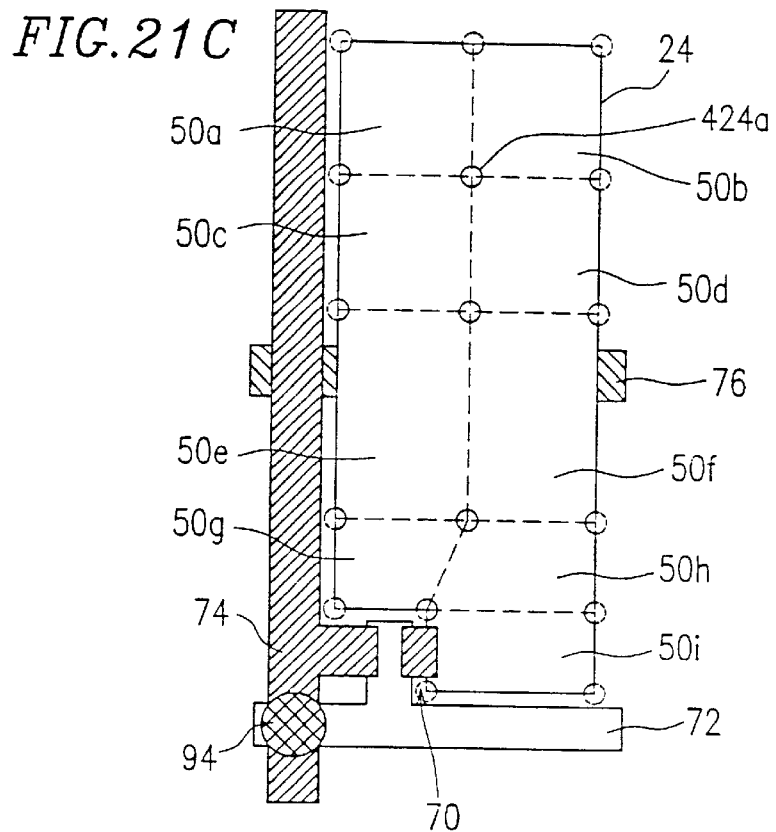
Figure 21D:
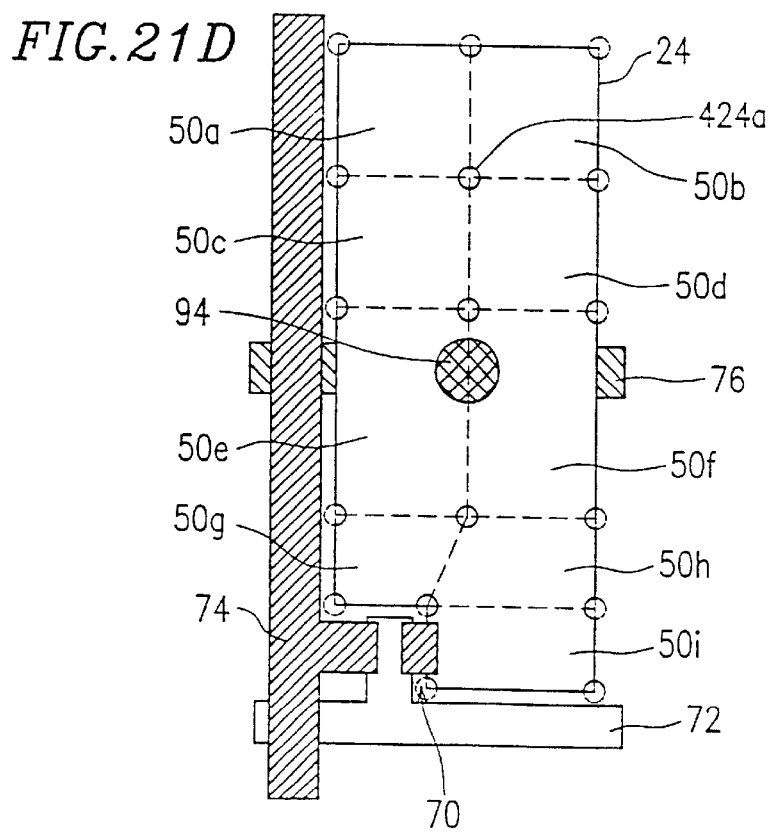

FIGS. 21A through 21D show exemplary active matrix substrates of an LCD device in the sixth example. In FIGS. 21A and 21B, the openings 24a are a distance away from the edges of the pixel electrode 24. In FIGS. 21C and 21D, the openings 424a are along and overlapping the edges of the pixel electrode 24. As shown in FIGS. 21A through 21D, a column-like projection 94 is provided.

The column-like projection 94 shown in FIGS. 21A and 21C is formed in, for example, the following manner.

The active matrix substrate is formed in the same manner as in the first example. On the active matrix substrate, a photocurable resin (e.g., OMR83, Tokyo Ohka Kogyo Co., Ltd.) is applied to a thickness of about 4 μm. The photocurable resin is treated with exposure and development to be partially left in the shape of the column-like projection 94 on a line provided in a peripheral area of the pixel region.

In the case where the storage capacitance common line 76 is formed of a light-blocking material, such as a metal material, the column-like projection 94 can be provided above the storage capacitance common line 76 as shown in FIGS. 21B and 21D.

Figure 22A:
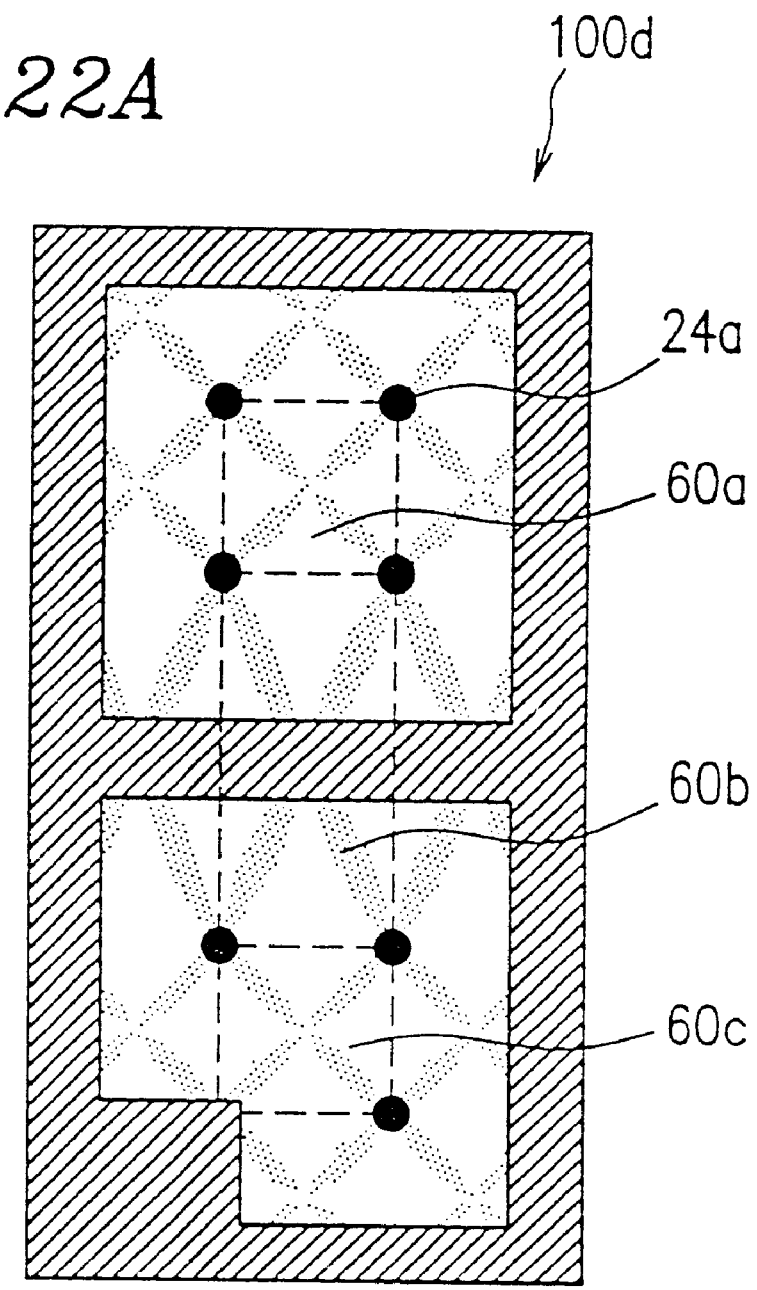
FIGS. 22A and 22B are each a view of an LCD device in the sixth example observed with a polarizing microscope in a crossed nicols state, the LCD device being supplied with a voltage for gray scale display.
Figure 22B:
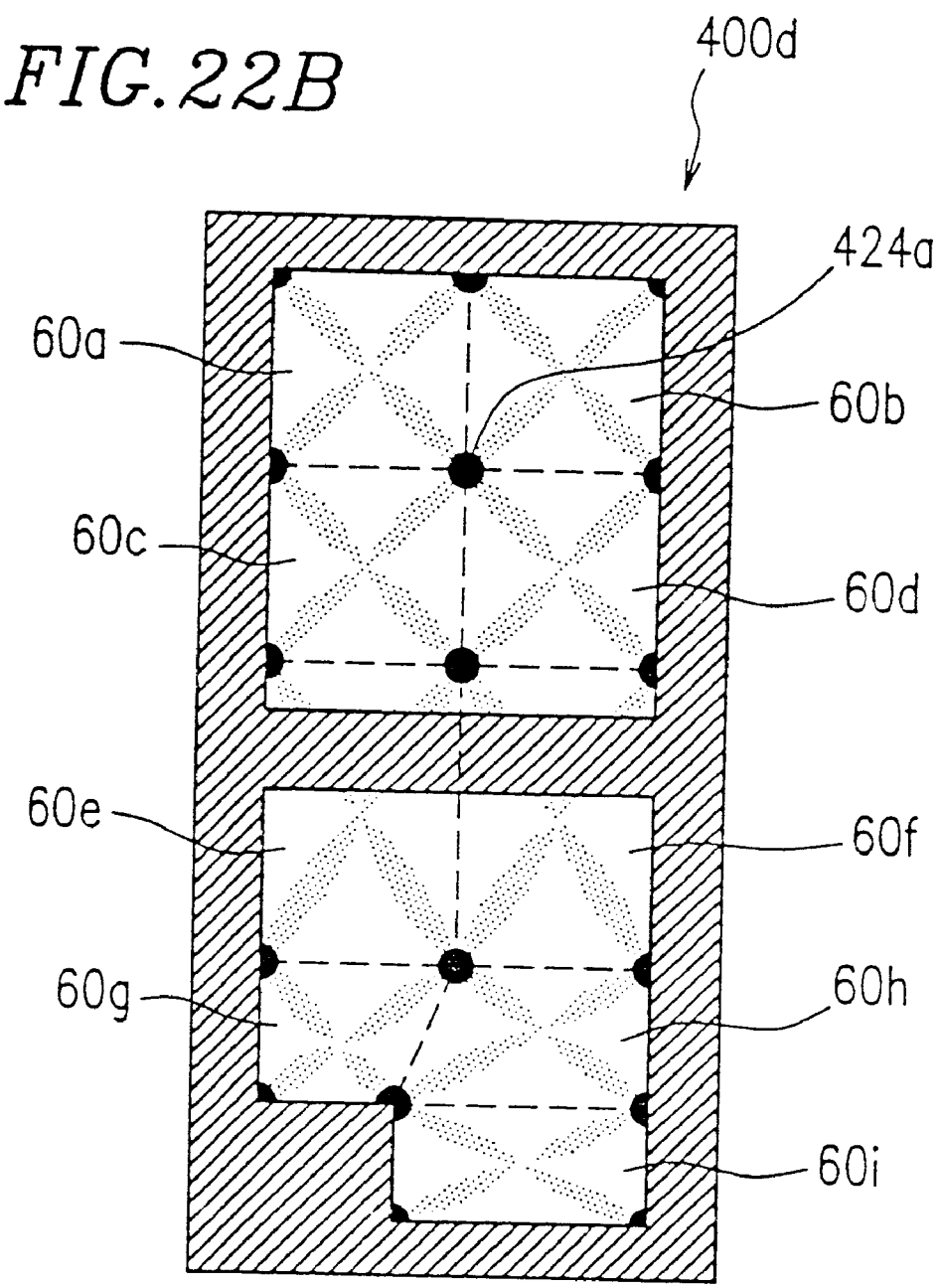

FIG. 22A is a top view of a pixel area 100d of an LCD device including the active matrix substrate shown in FIG. 21A or 21B, in which the openings 24a are a distance away from the edges of the pixel electrode. FIG. 22B is a top view of a pixel area 400d of an LCD device including the active matrix substrate shown in FIG. 21C or 21D, in which the openings 424a are along and overlapping the edges of the pixel electrode. The views shown in FIGS. 22A and 22B are obtained by a polarized microscope when the LCD devices are supplied with a voltage for gray scale display.

As shown in FIGS. 22A and 22B, the liquid crystal molecules in the vicinity of the openings 24a or 424a are aligned radially around each opening 24a or 424a. The liquid crystal molecules farther from the opening 24a or 424a are tilted at a greater angle with respect to the line normal to the surfaces of the vertical alignment layers than the liquid crystal molecules closer to the opening 24a or 424a. Thus, the liquid crystal molecules in each of a plurality of sub pixel regions in the pixel region 100d or 400d are aligned in an axially symmetrical manner.

Accordingly, the LCD device in the sixth example has a high viewing angle characteristic. The response time is sufficiently short, and no image sticking phenomenon is exhibited. The disturbance in the axially symmetrical alignment of the liquid crystal molecules caused when the pixel regions contain plastic beads is not exhibited. The uniformity in the thickness of the liquid crystal layer is raised, thus improving the display quality.

EXAMPLE 7

In the first through sixth examples, the liquid crystal layer 40 is formed of a nematic liquid crystal material having a negative dielectric anisotropy. In a seventh example according to the present invention, a chiral dopant (e.g., S811, Merck & Co., Inc.) is added to such a liquid crystal material, so that the chiral pitch in the liquid crystal layer 40 is about 18 μm. In other words, the chiral dopant is added so that the liquid crystal molecules have a twist angle of about 90 degrees, i.e., a spiral pitch about four times the cell thickness, for the following reasons. When the twist angle of the liquid crystal molecules is about 90 degrees when an electric field is applied, the light utilization ratio and the color balance for the white display are optimized as in conventional twisted nematic LCD devices. When the amount of the chiral dopant is excessively small, the twist orientation of the liquid crystal molecules when an electric field is applied may be undesirably unstable. When the amount of the chiral dopant is excessively large, the vertical alignment of the liquid crystal molecules when no voltage is applied may be undesirably unstable.

Except for the addition of the chiral dopant, the LCD device in the seventh example has a substantially identical structure with, and can be produced in a similar method, to the LCD device 100 in the first example.

Figure 23A:
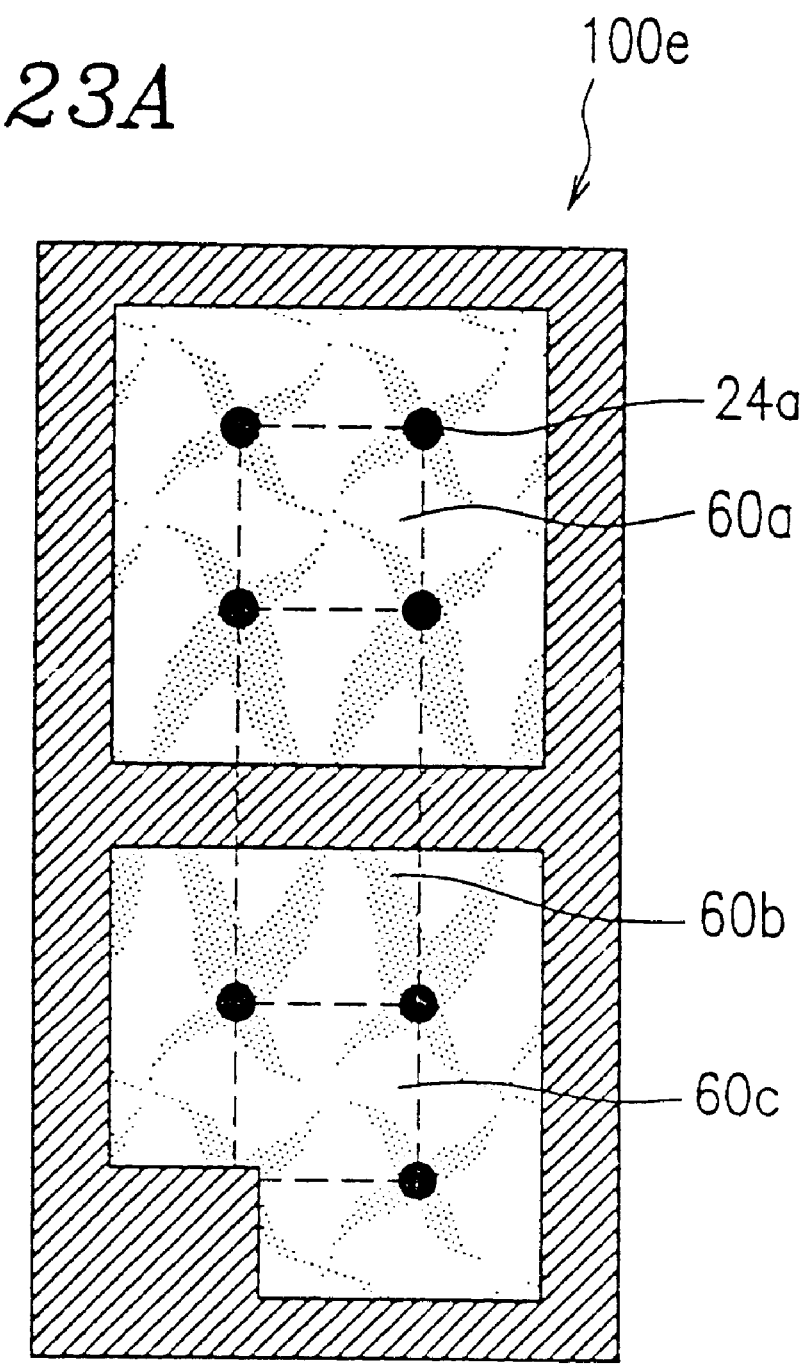
FIGS. 23A and 23B are each a view of an LCD device in a seventh example according to the present invention observed with a polarizing microscope in a crossed nicols state, the LCD device being supplied with a voltage f or gray scale display.
Figure 23B:
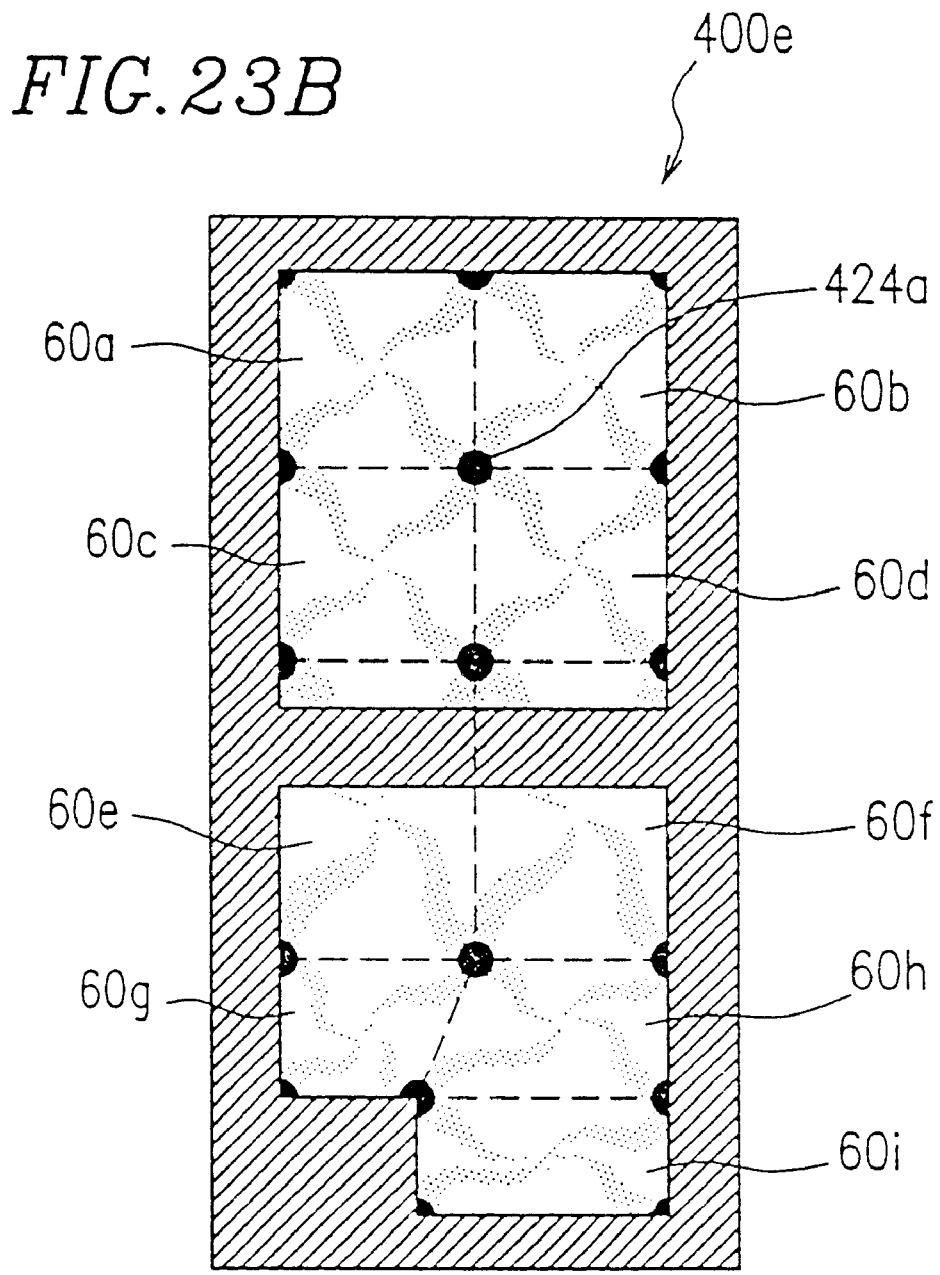

FIG. 23A is a top view of a pixel area 100e of an LCD device in the seventh example, in which the openings 24a are a distance away from the edges of the pixel electrode. FIG. 23B is a top view of the pixel area 400e of another LCD device in the seventh example, in which the openings 424a are along and overlapping the edges of the pixel electrode. The views shown in FIGS. 23A and 23B are obtained by a polarized microscope when the LCD devices are supplied with a voltage for gray scale display.

As shown in FIGS. 23A and 23B, the liquid crystal molecules in the vicinity of the openings 24a or 424a are aligned radially around each opening 24a or 424a. The liquid crystal molecules farther from the opening 24a or 424a are tilted at a greater angle with respect to the line normal to the surfaces of the vertical alignment layers than the liquid crystal molecules closer to the opening 24a or 424a. Thus, the liquid crystal molecules in each of a plurality of sub pixel regions in the pixel region 100e or 400e are aligned in an axially symmetrical manner.

Accordingly, the LCD device in the seventh example has a high viewing angle characteristic. The response time is sufficiently short, and no image sticking phenomenon is exhibited. Compared to the LCD device 100 in which the liquid crystal layer 40 does not include a chiral dopant, the seventh example provides a brighter image with a smaller dark field. The light transmittance is not reduced even when the pixel electrode 24 has a great number of openings or large-sized openings.

EXAMPLE 8

In an eighth example according to the present invention, LCD devices further including an appropriate phase plate for further widening the viewing angle range will be described.

Figure 24A:
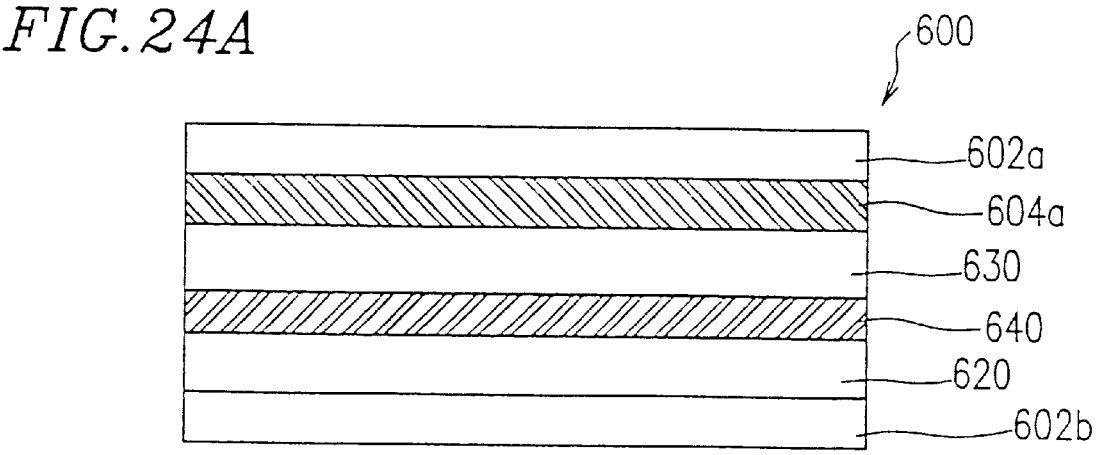
FIGS. 24A and 24B are each a cross-sectional view of an LCD device in an eighth example according to the present invention, including a phase plate or phase plates.

As shown in FIG. 24A, an LCD device 600 includes a pair of polarizers 602a and 602b in addition to a first substrate 620, a second substrate 630 and a liquid crystal layer 640 interposed between the substrates 620 and 630. The first substrate 620, the second substrate 630 and the liquid crystal layer 640 can have any structure described in the first through seventh examples. The polarizer 602a is closer to the display plane, and the polarizer 602b is closer to the backlight. The light absorbing direction of the polarizer 602b is the x direction. A direction vertical to the x direction within the display plane is the y direction. A direction normal to the display plane is the z direction.

In the LCD device 600 shown in FIG. 24A, a phase plate 604a is provided between the second substrate 630 and the polarizer 602a. Where the refractive index of the phase plate 604a is (nx, ny, nz), the phase plate 602a has a relationship of nx=ny>nz.

The viewing angle characteristic of the LCD device 600 is improved by setting a retardation of the phase plate 604a to be about ½ to ³⁄₂ of a retardation of the liquid crystal layer 640. The retardation of the phase plate 604a=film thickness (dp) of the phase plate 604a×{(nx+ny))/2−nz}. The retardation of the liquid crystal layer 640=thickness of the liquid crystal layer 640×(ne−no). A similar effect is obtained by providing the phase plate 604a between the first substrate 620 and the polarizer 602b. "ne" represents the refractive index of extraordinary rays, and "no" represents the refractive index of ordinary rays.

Figure 24B:
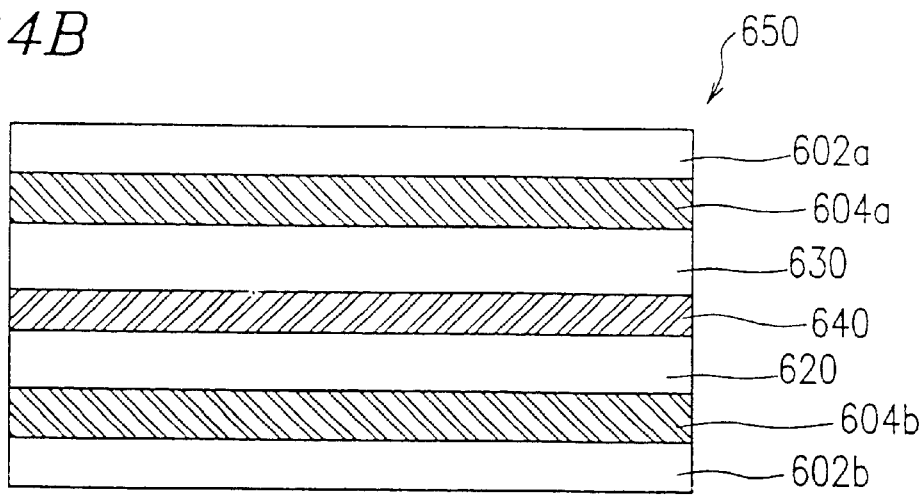

In an LCD device 650 shown in FIG. 24B, the phase plate 604a is provided between the second substrate 630 and the polarizer 602a, and the phase plate 604b is provided between the first substrate 620 and the polarizer 602b. Where the refractive index of each of the phase plates 604a and 604b is (nx, ny, nz), the phase plates 602a and 602b each have the relationship of nx=ny>nz.

The viewing angle characteristic of the LCD device 650 is improved by setting a total of the retardations of the phase plates 604a and 604b to be about ½ to about ³⁄₂ of the retardation of the liquid crystal layer 640.

Figure 25A:
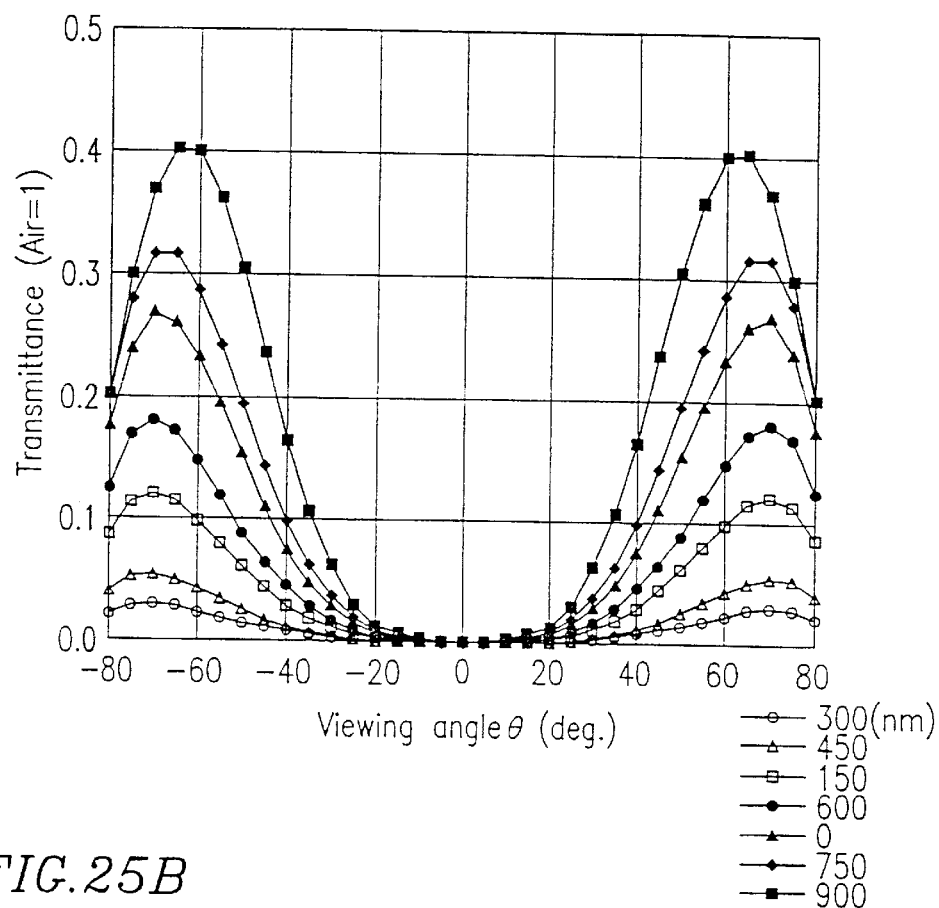
FIG. 25A is a graph illustrating the dependency of the light transmittance on the viewing angle of LCD devices including LCD devices shown in FIG. 24B in a black display state.
Figure 25B:
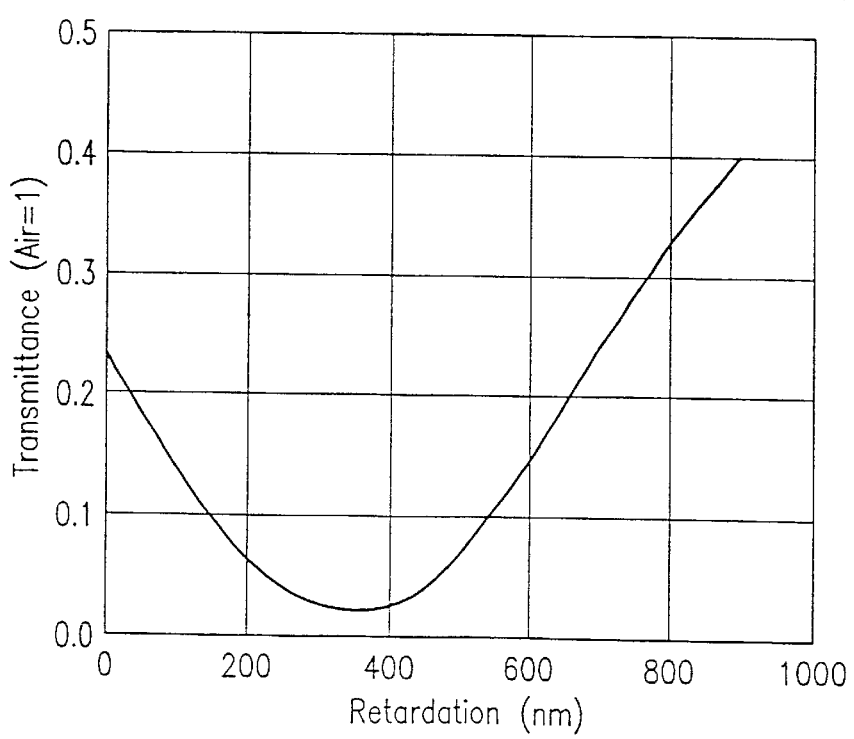
FIG. 25B is a graph illustrating the relationship between the light transmittance and the retardation of the phase plate when the viewing angle is 60 degrees.

FIG. 25A is a graph illustrating the dependency of the light transmittance on the viewing angle in the black display state of the LCD device 650 including the phase plates 604a and 604b (FIG. 24B). The retardation of the liquid crystal layer is 360 nm (thickness of the liquid crystal layer: 4.5 μm, ne=1.55, no=1.47). The total of the retardations of the phase plates 604a and 604b is varied. The horizontal axis (viewing angle θ) of FIG. 25A represents the viewing angle with respect to the direction which is 45 degrees with respect to the polarization axis (i.e., the angle with respect to the direction normal to the display plane). The vertical axis (transmittance) of FIG. 25A represents a value normalized with the light transmittance of air being 1. FIG. 25B illustrates values of transmittance plotted with respect to the retardation. The values of transmittance are obtained when the viewing angle θ is 60 degrees.

As can be appreciated from FIG. 25A, when no phase plate is provided (retardation: 0 nm), the light transmittance is raised (i.e., light leaks) as the viewing angle θ increases in a direction which is 45 degrees offset from the polarization axis. Thus, a satisfactory black display state is not obtained. When the phase plate 604a (and/or 604b) is provided and the retardation thereof {dp×(nx+ny)/2−nz} is set at an appropriate value, the light transmittance is reduced as shown in FIG. 25B. Specifically when the total of the retardations of the phase plate 604a and 604b is about 180 nm (½ of the retardation of the liquid crystal layer) to about 540 nm (³⁄₂ of the retardation of the liquid crystal layer), the increase of the light transmittance is reduced to half or less of the increase of the light transmittance obtained when no phase plate is provided, at θ=60 degrees.

As described above, where no phase plate is provided, the black display state with no voltage being applied is satisfactory when observed in the direction normal to the display plane as described above. However, in a direction inclined with respect to the normal direction, a phase difference generated by the liquid crystal layer causes light leakage and thus degradation of the black display. The phase plate or plates shown in FIGS. 24A and 24B compensate for such a phase difference, and thus allows a satisfactory black display state to be provided in a wide viewing angle range. In other words, high contrast images are obtained in a wide viewing angle range.

Figure 26A:
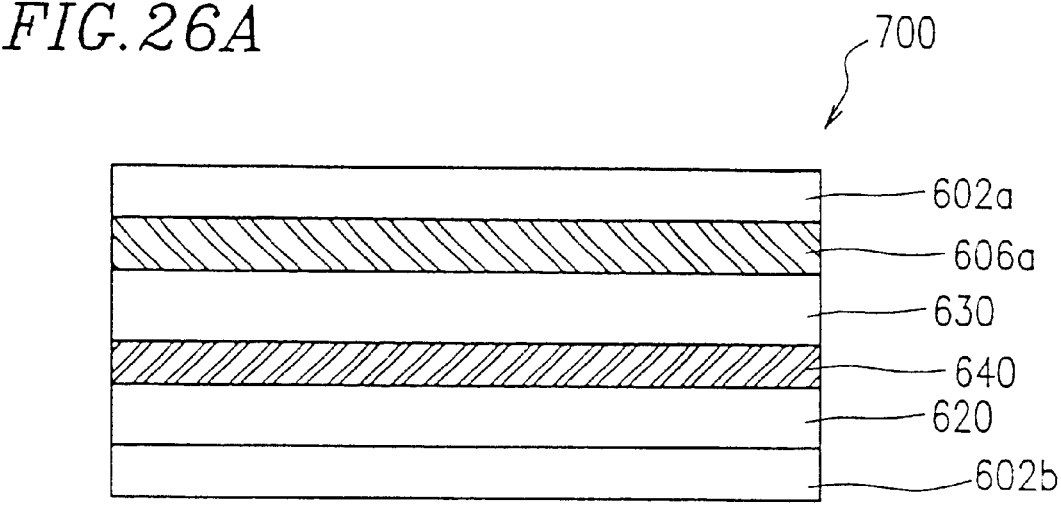
FIGS. 26A and 26B are each across-sectional view of an LCD device in the eighth example, including a phase plate or phase plates.
Figure 26B:
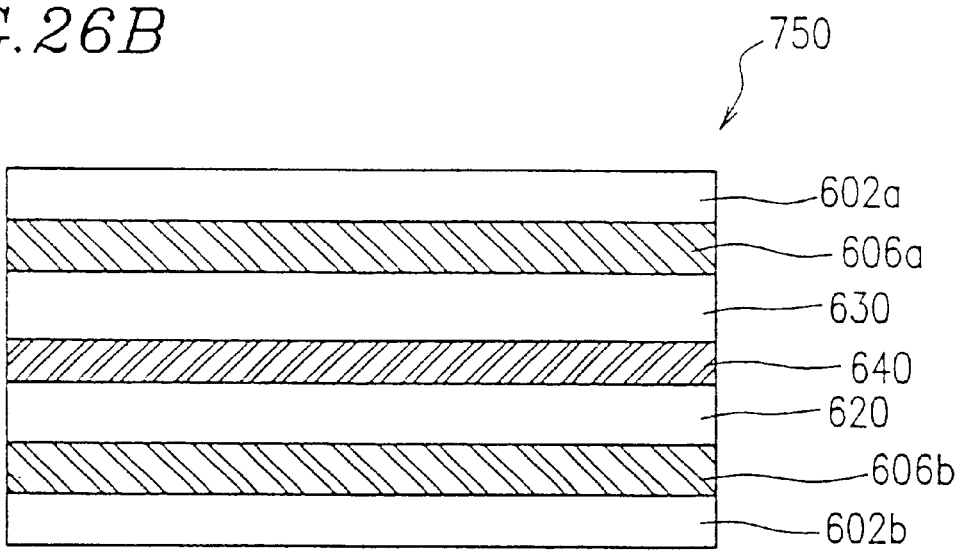

FIG. 26A shows an LCD device 700 including a phase plate 606a provided between the second substrate 630 and the polarizer 602a. FIG. 26B shows an LCD device 750 including a phase plate 606a provided between the second substrate 630 and the polarizer 602a and a phase plate 606b provided between the first substrate 620 and the polarizer 602b. The phase plates 606a and 606b each have a relationship of nx>ny=nz. The viewing angle characteristic of the LCD device 750 is improved by setting a total of retardations of the phase plates 606a and 606b to be about ¹⁄₁₀ to about ⁷⁄₁₀ of a retardation of the liquid crystal layer 640. The retardation of each of the phase plates 606a and 606b is dp×{nx−(ny+nz)/2}. Provision of the phase plate or plates improves the black display state when observed in the azimuth direction which is 45 degrees offset with respect from the light absorbing axis of the polarizers 602a and 602b.

Figure 27A:
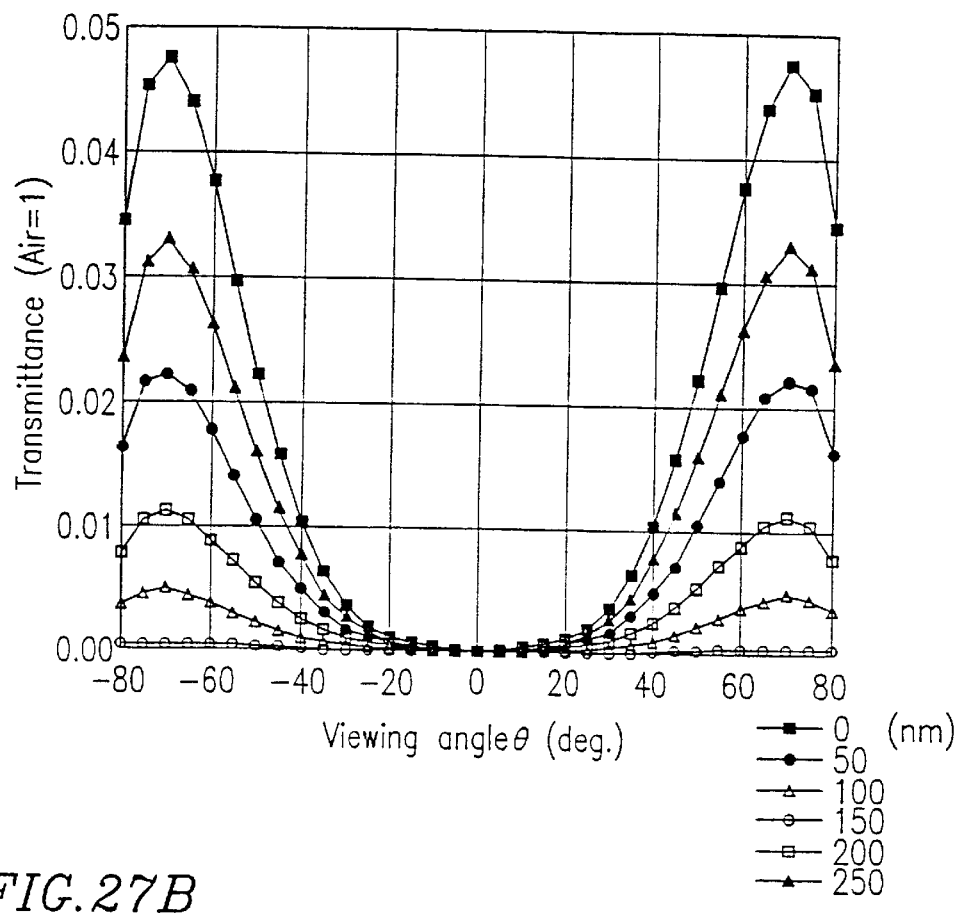
FIG. 27A is a graph illustrating the dependency of the light transmittance on the viewing angle of LCD devices including LCD devices shown in FIG. 26B in a black display state.
Figure 27B:
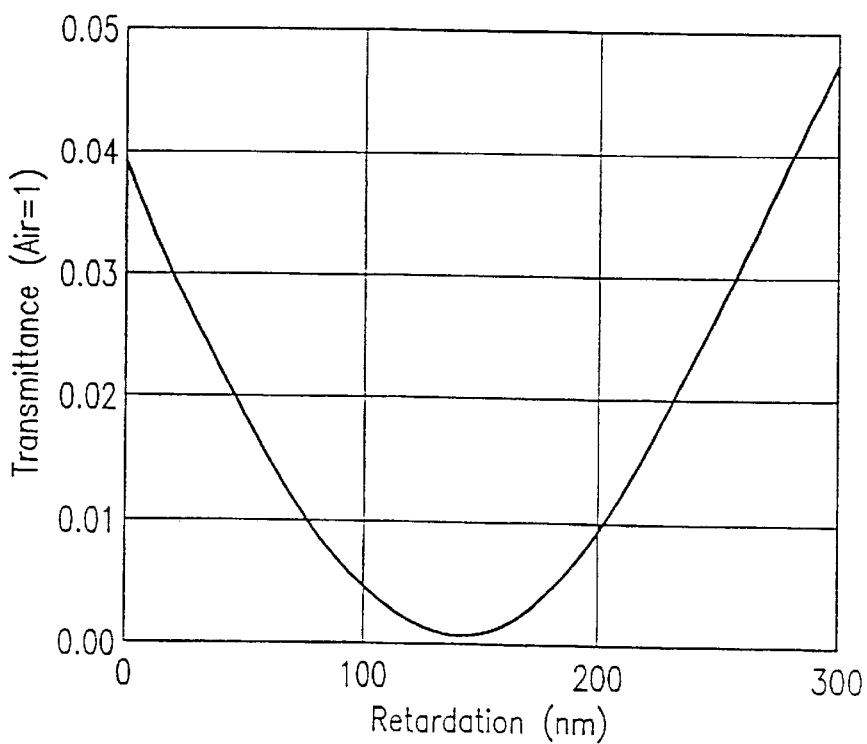
FIG. 27B is a graph illustrating the relationship between the light transmittance and the retardation of the phase plate when the viewing angle is 60 degrees.

FIG. 27A is a graph illustrating the dependency of the light transmittance on the viewing angle in the black display state of the LCD device 750 including the phase plates 606a and 606b (FIG. 26B). The retardation of the liquid crystal layer is 360 nm (thickness of the liquid crystal layer: 4.5 μm, ne=1.55, no=1.47). The total of the retardations of the phase plates 606a and 606b is varied. The retardation in the direction of the nz axis, i.e., {dp×(nx+ny)/2−nz} of the phase plates 606a and 606b is fixed at 250 nm. The horizontal axis (viewing angle θ) of FIG. 27A represents the viewing angle with respect to the direction which is 45 degrees with respect to the polarization axis (i.e., the angle with respect to the direction normal to the display plane). The vertical axis (transmittance) of FIG. 25 represents a value normalized with the light transmittance of air being 1. FIG. 27B illustrates values of transmittance plotted with respect to the retardation. The values of transmittance are obtained when the viewing angle θ is 60 degrees.

As can be appreciated from FIG. 27A, when no phase plate is provided (retardation: 0 nm), the light transmittance is raised (i.e., light leaks) as the viewing angle θ increases in a direction which is 45 degrees offset from the polarization axis. Thus, a satisfactory black display state is not obtained. When the phase plate 606a (and/or 606b) is provided and the retardation thereof dp×{nx−(ny+nz)/2)} is set at an appropriate value, the light transmittance is reduced as shown in FIG. 27B. Specifically when the total of the retardations of the phase plate 606a and 606b is about 36 nm (¹⁄₁₀ of the retardation of the liquid crystal layer) to about 252 nm (⁷⁄₁₀ of the retardation of the liquid crystal layer), the transmission is below about 0.03. Accordingly, the increase of the light transmittance is lower than the increase of the light transmittance obtained when no phase plate is provided, at θ=60 degrees.

Figure 28A:
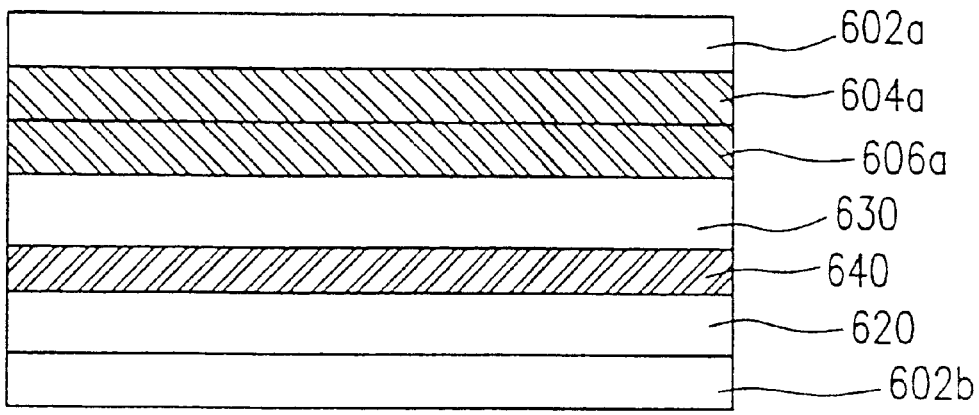
FIGS. 28A, 28B and 28C are each a cross-sectional view of an LCD device in the eighth example, including a phase plate or phase plates.
Figure 28B:
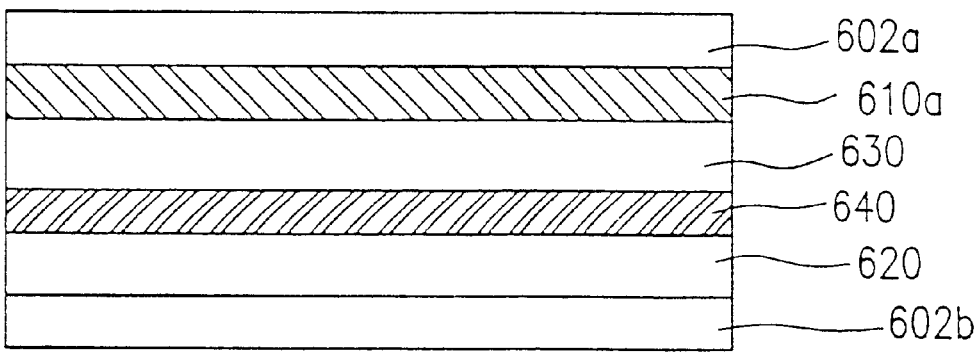
Figure 28C:
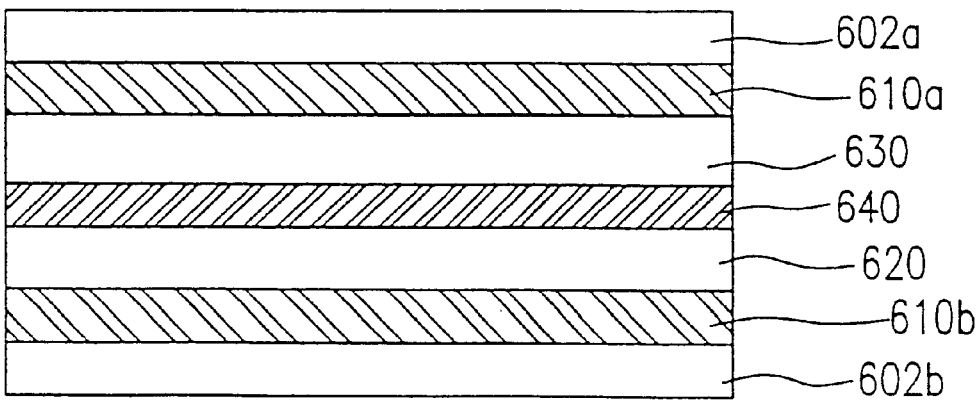

The two types of phase plates, i.e., 604a or 604b in FIGS. 24A and 24B and 606a or 606b in FIGS. 26A and 26B can be combined together as shown in FIGS. 28A. The two types of phase plates can be combined in any other combination. A similar viewing angle characteristic is obtained by providing a biaxial phase plate 610a (FIG. 28B) or biaxial phase plates 610a and 610b (FIG. 28C). The biaxial phase plates 610a and 610b provide a substantially equal refractive index anisotropy to the refractive index anisotropy obtained by the two monoaxial phase plates. Use of one biaxial phase plate in lieu of two monoaxial phase plates reduces the number of production steps.

In the first through eighth examples, a vertical alignment mode liquid crystal layer is used. The present invention is not limited to such a structure. A similar effect is obtained when a horizontal alignment mode (e.g., twisted nematic or super twisted nematic mode) liquid crystal layer is used.

In the first through eighth examples, the transmission active matrix substrate LCD devices are described. The present invention is not limited to such a type of LCD devices and is widely applicable to reflective LCD devices and simple matrix LCD devices.

As described above, according the present invention, an LCD device having a high viewing angle characteristic and preventing an image sticking phenomenon is provided. The liquid crystal molecules are aligned in an axially symmetrical manner uniformly and stably in a plurality of sub pixel regions included in each of pixel regions. Such alignment of the liquid crystal molecules provides a wide viewing angle range to improve the display quality, and a high speed response. The LCD device according to the present invention can be produced without requiring any additional step to the conventional production method, and thus does not raise the production cost.

According to the present invention, the alignment of the liquid crystal molecules is prevented from becoming unstable due to the lateral electric field generated by scanning lines and signal lines (bus lines) provided for connecting the active devices.

According to the present invention, generation of disclination at near edges of the pixel electrode is suppressed.

According to the present invention, the alignment of the liquid crystal molecules is stable, which provides a bright display.

An LCD device according to the present invention is applicable in monitors of, for example, computers, wordprocessors, car navigation systems, and TVs.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal device, comprising:
a first substrate;
a second substrate; and
a liquid crystal layer interposed between the first substrate and the second substrate and having liquid crystal molecules therein,
wherein:
the first substrate includes a first electrode facing the liquid crystal layer,
the second substrate includes a second electrode facing the liquid crystal layer,
the first electrode, the second electrode, and a region of the liquid crystal layer supplied with a voltage by the first electrode and the second electrode define a pixel region which is a unit for display,
the pixel region includes a plurality of sub pixel regions, in each of which the liquid crystal molecules are aligned in an axial symmetrical manner,
at least one of the first electrode and the second electrode includes a plurality of openings, which are regularly arranged, in the pixel region,
the at least one of the first electrode and the second electrode having the openings include a plurality of polygonal sub electrode regions, each of which has at least a part of the plurality of openings at least one of at corners and along and overlapping sides thereof, and
the plurality of sub pixel regions are defined by the sub electrode regions.

2. A liquid crystal display device according to claim 1, wherein:
the first electrode includes a plurality of pixel electrodes arranged in a matrix, and the plurality of pixel electrodes are each connected to a scanning line and a signal line through a switching device,
the second electrode is a counter electrode facing the plurality of pixel electrodes, and
the plurality of pixel electrodes each have at least one of the plurality of sub electrode regions.

3. A liquid crystal display device according to claim 2, wherein at least two of the plurality of sub electrode regions are congruent polygons to each other and share a common side.

4. A liquid crystal display device according to claim 3, wherein the polygons each have rotationary symmetry, and the liquid crystal molecules are aligned in an axially symmetrical manner with respect to an axis for the rotationary symmetry of the polygons.

5. A liquid crystal display device according to claim 2, wherein at least two of the plurality of sub electrode regions are polygons sharing a common side, and the openings are at least 2 μm away from an edge of the pixel electrode.

6. A liquid crystal display device according to claim 5, wherein the polygons are congruent to each other.

7. A liquid crystal display device according to claim 6, wherein the polygons each have rotationary symmetry, and the liquid crystal molecules are aligned in an axially symmetrical manner with respect to an axis for the rotationary symmetry of the polygons.

8. A liquid crystal display device according to claim 5, wherein the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

9. A liquid crystal display device according to claim 5, wherein at least one of the first substrate and the second substrate includes a column-like projection, for controlling the thickness of the liquid crystal layer, outside the pixel region.

10. A liquid crystal display device according to claim 5, wherein the liquid crystal layer includes a chiral dopant, and the liquid crystal molecules have a spiral pitch which is about four times the thickness of the liquid crystal layer.

11. A liquid crystal display device according to claim 5, further comprising a pair of polarizers interposing the first substrate and the second substrate, and at least one monoaxial phase plate having a negative refractive index anisotropy.

12. A liquid crystal display device according to claim 5, further comprising a pair of polarizers interposing the first substrate and the second substrate, and at least one monoaxial phase plate having a positive refractive index anisotropy.

13. A liquid crystal display device according to claim 5, further comprising a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

14. A liquid crystal display device according to claim 2, wherein at least two of the plurality of sub electrode regions are polygons sharing a common side, and at least one of sides of at least one of the sub electrode regions matches at least one of edges of the pixel electrode.

15. A liquid crystal display device according to claim 14, wherein the polygons are congruent to each other.

16. A liquid crystal display device according to claim 15, wherein the polygons each have rotationary symmetry, and the liquid crystal molecules are aligned in an axially symmetrical manner with respect to an axis for the rotationary symmetry of the polygons.

17. A liquid crystal display device according to claim 14, wherein the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

18. A liquid crystal display device according to claim 14, wherein at least one of the first substrate and the second substrate includes a column-like projection, for controlling the thickness of the liquid crystal layer, outside the pixel region.

19. A liquid crystal display device according to claim 14, wherein the liquid crystal layer includes a chiral dopant, and the liquid crystal molecules have a spiral pitch which is about four times the thickness of the liquid crystal layer.

20. A liquid crystal display device according to claim 14, further comprising a pair of polarizers interposing the first substrate and the second substrate, and at least one monoaxial phase plate having a negative refractive index anisotropy at least one of between the first substrate and the polarizer closer to the first substrate than to the second substrate and between the second substrate and the polarizer closer to the second substrate than to the first substrate.

21. A liquid crystal display device according to claim 14, further comprising a pair of polarizers interposing the first substrate and the second substrate, and at least one monoaxial phase plate having a positive refractive index anisotropy at least one of between the first substrate and the polarizer closer to the first substrate than to the second substrate and between the second substrate and the polarizer closer to the second substrate than to the first substrate.

22. A liquid crystal display device according to claim 14, further comprising a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

23. A liquid crystal display device according to claim 1, wherein at least one of the first substrate and the second substrate has an alignment fixing layer, for controlling the axial symmetrical alignment of the liquid crystal molecules, between the liquid crystal layer and at least one of the first electrode and the second electrode.

24. A liquid crystal display device according to claim 23, wherein:
the first electrode includes a plurality of pixel electrodes arranged in a matrix, and the plurality of pixel electrodes are each connected to a scanning line and a signal line through a switching device,
the second electrode is a counter electrode facing the plurality of pixel electrodes, and
the plurality of pixel electrodes each have at least one of the plurality of sub electrode regions.

25. A liquid crystal display device according to claim 24, wherein at least two of the plurality of sub electrode regions are congruent polygons to each other and share a common side.

26. A liquid crystal display device according to claim 25, wherein the polygons each have rotationary symmetry, and the liquid crystal molecules are aligned in an axially symmetrical manner with respect to an axis for the rotationary symmetry of the polygons.

27. A liquid crystal display device according to claim 23, wherein at least one of the first substrate and the second substrate includes a column-like projection, for controlling the thickness of the liquid crystal layer, outside the pixel region.

28. A liquid crystal display device according to claim 23, wherein the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

29. A liquid crystal display device according to claim 23, further comprising a pair of polarizers interposing the first substrate and the second substrate, and at least one monoaxial phase plate having a negative refractive index anisotropy.

30. A liquid crystal display device according to claim 23, further comprising a pair of polarizers interposing the first substrate and the second substrate, and at least one monoaxial phase plate having a positive refractive index anisotropy.

31. A liquid crystal display device according to claim 23, further comprising a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

32. A liquid crystal display device according to claim 23, wherein the liquid crystal layer includes a chiral dopant, and the liquid crystal molecules have a spiral pitch which is about four times the thickness of the liquid crystal layer.

33. A liquid crystal display device according to claim 1, wherein at least one of the first electrode and the second electrode has a plurality of recessed portions which are regularly arranged.

34. A liquid crystal display device according to claim 1, wherein at least one of the first substrate and the second substrate includes a column-like projection, for controlling the thickness of the liquid crystal layer.

35. A liquid crystal display device according to claim 1, wherein the liquid crystal layer is formed of a liquid crystal material having a negative dielectric anisotropy, and the liquid crystal molecules of the liquid crystal material are aligned substantially vertically with respect to surfaces of the first substrate and the second substrate in the state where no voltage is applied.

36. A liquid crystal display device according to claim 1, further comprising a pair of polarizers interposing the first substrate and the second substrate, and at least one monoaxial phase plate having a negative refractive index anisotropy at least one of between the first substrate and the polarizer closer to the first substrate than to the second substrate and between the second substrate and the polarizer closer to the second substrate than to the first substrate.

37. A liquid crystal display device according to claim 1, further comprising a pair of polarizers interposing the first substrate and the second substrate, and at least one monoaxial phase plate having a positive refractive index anisotropy at least one of between the first substrate and the polarizer closer to the first substrate than to the second substrate and between the second substrate and the polarizer closer to the second substrate than to the first substrate.

38. A liquid crystal display device according to claim 1, further comprising a pair of polarizers interposing the first substrate and the second substrate, and at least one biaxial phase plate at least one of between the first substrate and the polarizer closer to the first substrate than to the second substrate and between the second substrate and the polarizer closer to the second substrate than to the first substrate.

39. A liquid crystal display device according to claim 1, wherein the liquid crystal layer includes a chiral dopant, and the liquid crystal molecules have a spiral pitch which is about four times the thickness of the liquid crystal layer.

40. A method for producing a liquid crystal display device including a first substrate, a second substrate, and a liquid crystal layer interposed between the first substrate and the second substrate and formed of a liquid crystal material having liquid crystal molecules, wherein the first substrate includes a first electrode facing the liquid crystal layer; the second substrate includes a second electrode facing the liquid crystal layer; the first electrode, the second electrode, and a region of the liquid crystal layer supplied with a voltage by the first electrode and the second electrode define a pixel region which is a unit for display; and the pixel region includes a plurality of sub pixel regions, in each of which the liquid crystal molecules are aligned in an axial symmetrical manner, the method comprising the steps of:

forming a plurality of openings regularly arranged in at least one of the first electrode and the second electrode in the pixel region, so that the at least one of the first electrode and the second electrode having the openings include a plurality of polygonal sub electrode regions, each of which has a part of the openings at least one of corners and along and overlapping sides thereof;

injecting a mixture of a photocurable resin and the liquid crystal material into a gap between the first substrate and the second substrate; and irradiating the mixture with light while supplying the mixture with a voltage, thereby curing the photocurable resin and thus forming an alignment fixing layer.

\* \* \* \* \*